US012482408B2

(12) United States Patent
Kim et al.

(10) Patent No.: US 12,482,408 B2
(45) Date of Patent: Nov. 25, 2025

(54) DISPLAY DEVICE AND METHOD OF DRIVING THE SAME, AND ELECTRONIC DEVICE INCLUDING DISPLAY DEVICE

(71) Applicant: SAMSUNG DISPLAY CO., LTD., Yongin-si (KR)

(72) Inventors: Sung Hwan Kim, Yongin-si (KR); Won Kyu Kwak, Yongin-si (KR); Hwan Soo Jang, Yongin-si (KR); Seo Won Choe, Yongin-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

(21) Appl. No.: 18/740,095

(22) Filed: Jun. 11, 2024

(65) Prior Publication Data

US 2024/0420627 A1 Dec. 19, 2024

(30) Foreign Application Priority Data

Jun. 15, 2023 (KR) ........................ 10-2023-0076510

(51) Int. Cl.
*G09G 3/32* (2016.01)
*G09G 3/3266* (2016.01)
*G09G 3/3275* (2016.01)

(52) U.S. Cl.
CPC ............. *G09G 3/32* (2013.01); *G09G 3/3266* (2013.01); *G09G 3/3275* (2013.01); *G09G 2300/0426* (2013.01); *G09G 2310/0267* (2013.01); *G09G 2310/0275* (2013.01); *G09G 2310/08* (2013.01); *G09G 2320/0247* (2013.01); *G09G 2330/021* (2013.01); *G09G 2330/028* (2013.01)

(58) Field of Classification Search
None
See application file for complete search history.

(56) References Cited

U.S. PATENT DOCUMENTS 9,542,883 B2 1/2017 Lee et al.
9,607,552 B2 3/2017 Lim
11,309,373 B2 * 4/2022 Kim .................... H10K 59/123
(Continued)

FOREIGN PATENT DOCUMENTS

KR 10-1329966 11/2013
KR 10-2146107 8/2020
(Continued)

*Primary Examiner* — Christopher J Kohlman
(74) *Attorney, Agent, or Firm* — F. CHAU & ASSOCIATES, LLC

(57) ABSTRACT

A display device includes: a power supply configured to supply a voltage of first driving power to a first power line, and supply a voltage of second driving power to a second power line; a display panel including pixels connected to scan lines and data lines, and each including a first transistor configured to control current supplied from the first power line to the second power line via a light emitting element; and a timing controller configured to supply a luminance control signal to the pixels. Each of the pixels includes: a control transistor connected in parallel to some sub-transistors of the corresponding first transistor, and configured to be turned on in response to receipt of a luminance control signal having an enabled state. The power supply changes the voltage of the second driving power when the luminance control signal having the enabled state is supplied to the pixels.

46 Claims, 18 Drawing Sheets

(56) References Cited

U.S. PATENT DOCUMENTS

| | | | | |
|---|---|---|---|---|
| 2015/0138050 | A1* | 5/2015 | Kim | H04N 13/341<br>345/76 |
| 2021/0090494 | A1* | 3/2021 | Hwang | G09G 3/3266 |
| 2021/0366368 | A1 | 11/2021 | Watanabe et al. | |
| 2022/0310733 | A1 | 9/2022 | Kim | |

FOREIGN PATENT DOCUMENTS

| | | |
|---|---|---|
| KR | 10-2021-0006379 | 1/2021 |
| KR | 10-2021-0014815 | 2/2021 |
| KR | 10-2237138 | 4/2021 |
| KR | 10-2022-0135299 | 10/2022 |

* cited by examiner

SL1: SL11, SL12, ..., SL1n
SL2: SL21, SL22, ..., SL2n
SL3: SL31, SL32, ..., SL3n
SL4: SL41, SL42, ..., SL4n
EL: EL1, EL2, ..., ELo

M1: M1_1, M1_2
M3: M3_1, M3_2
M4: M4_1, M4_2

DISPLAY DEVICE AND METHOD OF DRIVING THE SAME, AND ELECTRONIC DEVICE INCLUDING DISPLAY DEVICE

CROSS-REFERENCE TO RELATED APPLICATION

The present U.S. patent application claims priority under 35 U.S.C. § 119 to Korean patent application number 10-2023-0076510, filed on Jun. 15, 2023, the entire disclosure of which is incorporated by reference in its entirety herein.

TECHNICAL FIELD

Embodiments of the present disclosure are directed to a display device, a method of driving the display device, and an electronic device including the display device.

DISCUSSION OF RELATED ART

A display device is used as a connection medium between a user and information. Examples of the display device include a liquid crystal display device and an organic light-emitting display device.

It may be difficult to view images on a display device in a dark environment. Accordingly, a luminance of the display device may be increased. However, a flickering phenomenon may occur in the display device when the luminance is increased.

SUMMARY

Embodiments of the present disclosure are directed to a display device, a method of driving the display device, and an electronic device including the display device, which can prevent a flickering phenomenon from occurring when the maximum luminance of the display device changes.

An embodiment of the present disclosure provides a display device including: a power supply, a display panel, and a timing controller. The power supply is configured to supply a voltage of first driving power to a first power line, and supply a voltage of second driving power to a second power line. The display panel includes pixels connected to scan lines and data lines, and each including a first transistor configured to control an amount of current supplied from the first power line to the second power line via a light emitting element. The timing controller is configured to supply a luminance control signal to the pixels. Each of the pixels includes a control transistor connected in parallel to some sub-transistors of the corresponding first transistor, and configured to be turned on in response to receipt of the luminance control signal having an enabled state. The power supply changes the voltage of the second driving power when the luminance control signal having the enabled state is supplied to the pixels.

In an embodiment, the power supply may increase the second driving power from a first voltage to a second voltage higher than the first voltage when the luminance control signal changes from a disabled state to the enabled state.

In an embodiment, the power supply may maintain the second driving power at the second voltage for a period of time and then gradually decrease the second driving power to a third voltage lower than the second voltage.

In an embodiment, the third voltage may be a voltage identical to the first voltage.

In an embodiment, the third voltage may be a voltage different from the first voltage.

In an embodiment, the power supply may further supply first initialization power for initializing a gate electrode of the first transistor to the pixels.

In an embodiment, the power supply may include the first initialization power from a first initialization voltage to a second initialization voltage higher than the first initialization voltage when the luminance control signal changes from the disabled state to the enabled state.

In an embodiment, the power supply may maintain the first initialization power at the second initialization voltage for the period of time and then gradually decrease the first initialization power to a third initialization voltage lower than the second initialization voltage.

In an embodiment, the power supply may decrease the second driving power from a third voltage to a fourth voltage lower than the third voltage when the luminance control signal changes from the enabled state to the disabled state.

In an embodiment, the power supply may maintain the second driving power at the fourth voltage for a period of time and then gradually increase the second driving power to a first voltage higher than the fourth voltage.

In an embodiment, the power supply may further supply first initialization power for initializing a gate electrode of the first transistor to the pixels.

In an embodiment, the power supply may decrease the first initialization power from a third initialization voltage to a fourth initialization voltage lower than the third initialization voltage when the luminance control signal changes from the enabled state to the disabled state.

In an embodiment, the power supply may maintain the first initialization power at the fourth initialization voltage for the period of time and then gradually increase the first initialization power to a first initialization voltage higher than the fourth initialization voltage.

In an embodiment, the display device may further include a plurality of emission control lines connected to the pixels. Each of the pixels may be controlled during emission time by an emission control signal supplied to the corresponding emission control line connected thereto.

In an embodiment, the display device may further include an emission driver configured to supply an emission control signal to the emission control lines. The emission driver may simultaneously supply the emission control signal having a disabled state to the emission control lines to prevent the pixels from emitting light when the luminance control signal changes from a disabled state to the enabled state.

In an embodiment, the emission driver may simultaneously supply the emission control signal having the disabled state to the emission control lines when the luminance control signal changes from the enabled state to the disabled state.

In an embodiment, each of the pixels may include: the light emitting element including a second electrode electrically connected to the second power line; the first transistor including the plurality of sub-transistors connected in series between a first node and a second node, the first node being electrically connected to the first power line during an emission period in which the light emitting element emits light, and the second node being electrically connected to a first electrode of the light emitting element during the emission period; and the control transistor connected a common node between the first node and the sub-transistors, with a gate electrode connected to a control line, and configured to be turned on when the luminance control signal having the enabled state is supplied to the control line, and turned off when the luminance control signal having a disabled state is supplied to the control line.

In an embodiment, each of the pixels may include: a second transistor connected between a data line and the first node, and including a gate electrode electrically connected to a first scan line; a third transistor connected between the second node and a third node to which gate electrodes of the sub-transistors are connected, and including a gate electrode electrically connected to a second scan line; a fourth transistor connected between the third node and a third power line configured to receive first initialization power, and including a gate electrode electrically connected to a third scan line; a fifth transistor connected between the first power line and the first node, and including a gate electrode electrically connected to an emission control line; a sixth transistor connected between the second node and the first electrode of the light emitting element, and including a gate electrode electrically connected to the emission control line; and a seventh transistor connected between the first electrode of the light emitting element and a fourth power line configured to receive second initialization power, and including a gate electrode electrically connected to a fourth scan line.

In an embodiment, the control line may be connected in common to the control transistors included in the respective pixels.

In an embodiment, the display device may include a first mode in which a maximum luminance of the display panel is set to a first luminance, and a second mode in which a maximum luminance of the display panel is set to a second luminance higher than the first luminance. The timing controller may supply the luminance control signal having a disabled state when a driving mode is set to the first mode, and supply the luminance control signal having the enabled state when the driving mode is set to the second mode.

In an embodiment, the display device may further include a normal mode in which the maximum luminance of the pixel component is set to a normal luminance lower than the first luminance. The power supply may gradually decrease the voltage of the second driving power when the driving mode changes from the normal mode to the first mode.

An embodiment of the present disclosure provides a display device, including: a power supply, pixels, and a timing controller. The power supply is configured to supply a voltage of first driving power to a first power line, and supply a voltage of second driving power to a second power line. The pixels each including a plurality of sub-transistors configured to control an amount of current to be supplied from the first power line to the second power line via a light emitting element, and a control transistor connected to a common node between the first power line and the sub-transistors, and configured to be turned on in response to receipt of a luminance control signal having an enabled state, and turned off in response to receipt of the luminance control signal having a disabled state. The timing controller is configured to supply the luminance control signal to a control line connected in common to a gate electrode of the control transistor. The power supply changes the voltage of the second driving power when the luminance control signal changes from the enabled state to the disabled state or changes from the disabled state to the enabled state.

In an embodiment, the power supply may increase the voltage of the second driving power when the luminance control signal changes from the disabled state to the enabled state.

In an embodiment, the power supply may gradually decrease the voltage of the second driving power after a period of time following the increase in the voltage of the second driving power.

In an embodiment, the power supply may decrease the voltage of the second driving power when the luminance control signal changes from the enabled state to the disabled state.

In an embodiment, the power supply may gradually increase the voltage of the second driving power after a period of time following the decrease in the voltage of the second driving power.

In an embodiment, the power supply may further supply first initialization power for initializing respective gate electrodes of the plurality of sub-transistors.

In an embodiment, the power supply may include a voltage of the first initialization power when the luminance control signal changes from the disabled state to the enabled state.

In an embodiment, the power supply may gradually decrease the voltage of the first initialization power after a period of time following the increase in the voltage of the first initialization power.

In an embodiment, the power supply may decrease the voltage of the first initialization power when the luminance control signal changes from the enabled state to the disabled state.

In an embodiment, the power supply may gradually increase the voltage of the first initialization power after a period of time following the decrease in the voltage of the first initialization power.

In an embodiment, the display device may further include a plurality of emission control lines connected to the pixels. Each of the pixels may be set to a non-emission state when an emission control signal having a disabled state is supplied to an emission control line connected thereto.

In an embodiment, the display device may further include an emission driver configured to supply an emission control signal to the emission control lines. The emission driver may simultaneously supply the emission control signal of the disabled state to the emission control lines when the luminance control signal changes from the enabled state to the disabled state or changes from the disabled state to the enabled state.

An embodiment of the present disclosure provides a method of driving a display device including pixels each including a driving transistor configured to control an amount of current flowing from first driving power to second driving power via a light emitting element. The method includes: determining whether the display device is in a first mode or a second mode; driving the pixels to have a maximum luminance set to a first luminance when it is determined that the display device is in the first mode; driving the pixels to have the maximum luminance set to a second luminance higher than the first luminance when it is determined that the display device is in the second mode; and controlling a control transistor connected in parallel to some sub-transistors of the driving transistor when changing from the first mode to the second mode or changing from the second mode to the first mode. A voltage of the second driving power changes when changing from the first mode to the second mode or changing from the second mode to the first mode.

In an embodiment, the sub-transistors may be connected in series. When the pixels are driven in the first mode, current may be supplied from all the sub-transistors to the light emitting element. When the pixels are driven in the second mode, current may be supplied from some of the sub-transistors to the light emitting element.

In an embodiment, when changing from the first mode to the second mode, the voltage of the second driving power may increase at a first slope.

In an embodiment, a voltage of the second driving power may increase at the first slope, and after a period of time, the voltage of the second driving power may decrease at a second slope gentler than the first slope.

In an embodiment, the method may further include initializing a gate electrode of the driving transistor by a voltage of first initialization power, and increasing the voltage of the first initialization power when changing from the first mode to the second mode.

In an embodiment, when changing from the second mode to the first mode, a voltage of the second driving power may decrease at a third slope.

In an embodiment, a voltage of the second driving power may decrease at the third slope, and after a period of time, the voltage of the second driving power may increase at a fourth slope gentler than the third slope.

In an embodiment, the method may further include initializing a gate electrode of the driving transistor by a voltage of first initialization power, and decreasing the voltage of the first initialization power when changing from the second mode to the first mode.

In an embodiment, the method may further include preventing the pixels from emitting light when changing from the first mode to the second mode or changing from the second mode to the first mode.

In an embodiment, the method may further include a normal mode in which the maximum luminance is set to a normal luminance lower than the first luminance. When changing from the normal mode to the first mode, the voltage of the second driving power may decrease.

An embodiment of the present disclosure provides an electronic device including: a main processor, an auxiliary processor, a display panel, and a voltage generation circuit. The main processor is configured to generate a driving mode signal based on at least one of an external light intensity and settings of a user. The auxiliary processor is configured to supply a luminance control signal set to one of an enabled state or a disabled state in response to the driving mode signal. The display panel is configured to control an amount of current flowing from first driving power to second driving power via pixels in response to a data signal supplied from the auxiliary processor, and display an image. The voltage generation circuit is configured to supply the second driving power of a first voltage when the luminance control signal having the disabled state is supplied, and supply a the second driving power of a second voltage that is higher than the first voltage when the luminance control signal having the enabled state is supplied. The pixels supply a higher current when the luminance control signal having the enables state is supplied in response to the data signal, compared to when the luminance control signal having the disabled state is supplied in response to the same data signal.

In an embodiment, a maximum luminance of the pixels may change in response to a mode of the driving mode signal.

In an embodiment, the voltage generation circuit may gradually decrease the second driving power from the second voltage to a third voltage lower than the second voltage.

DETAILED DESCRIPTION

Figure 1:
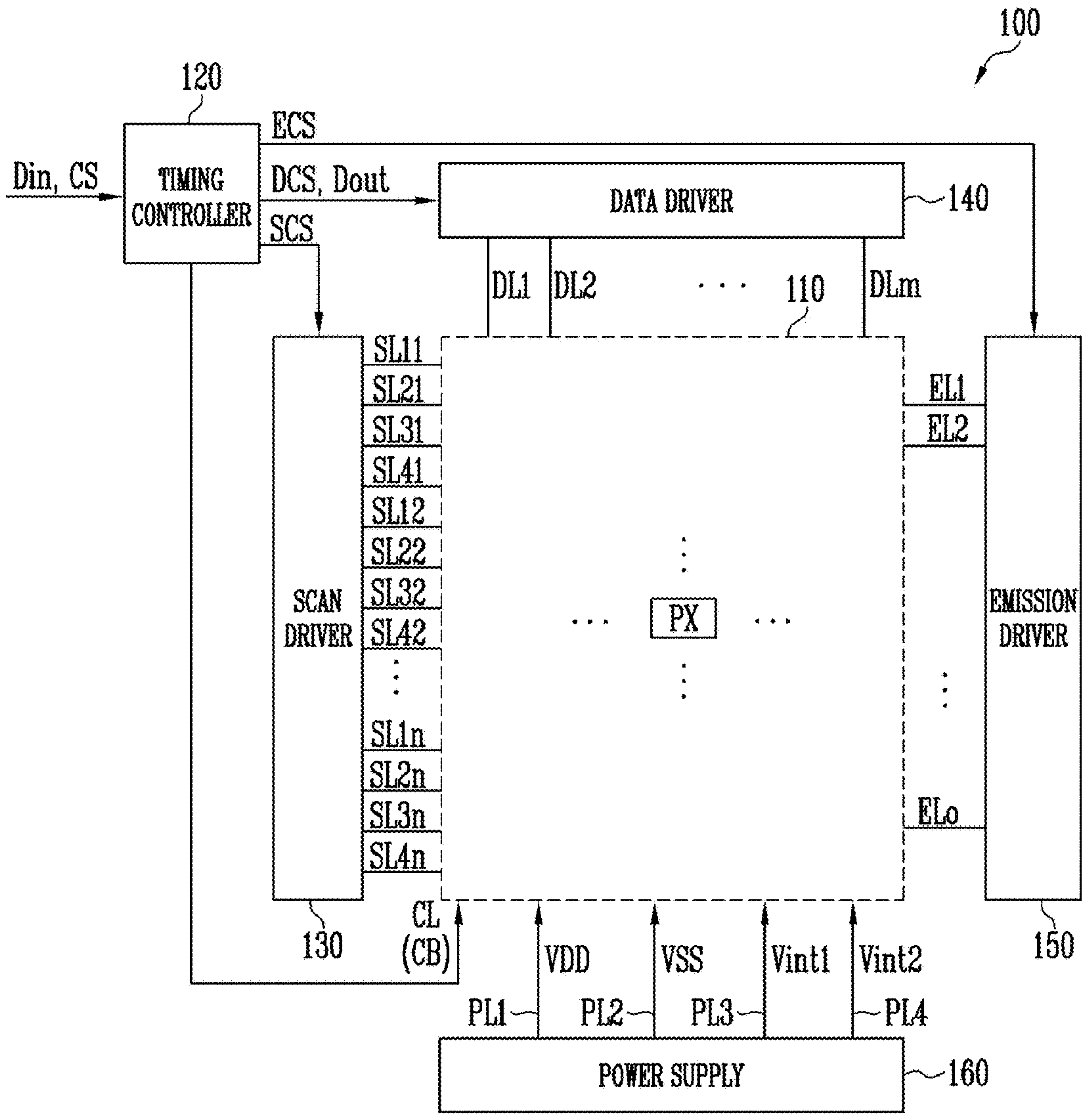
FIG. 1 is a diagram illustrating a display device in accordance with an embodiment of the present disclosure.

Hereinafter, embodiments of the present invention will be described in detail with reference to the attached drawings, such that those skilled in the art can implement the present invention. The present disclosure may be implemented in various forms, and is not limited to the embodiments to be described herein below.

It will be understood that when an element is referred to as being "between" two elements, it can be the only element between the two elements, or one or more intervening elements may also be present. Like reference numerals may refer to like elements throughout.

Furthermore, the expression "being the same" may mean "being substantially the same". In other words, the expression "being the same" may include a range that can be tolerated by those skilled in the art. The other expressions may also be expressions from which the term "substantially" has been omitted.

Some embodiments are described in the accompanying drawings in connection with functional blocks, units and/or modules. Those skilled in the art will understand that such blocks, units, and/or modules may be physically implemented by logic circuits, discrete components, microprocessors, hard-wired circuits, memory elements, line connections, and other electronic circuits. This may be formed using semiconductor-based fabrication techniques or other fabrication techniques. For blocks, units, and/or modules implemented by a microprocessor or other similar hardware, may be programmed and controlled using software to perform various functions discussed herein, and may be optionally driven by firmware and/or software. In addition, each block, unit, and/or module may be implemented by dedicated hardware, or be implemented by a combination of the dedicated hardware which performs some functions and a processor which performs different functions (e.g., one or more programmed microprocessors and related circuits). Furthermore, in some embodiments, blocks, units and/or modules may be physically separated into two or more individual blocks, units and/or modules which interact with each other without departing from the scope of the inventive concept. In some embodiments, blocks, units and/or modules may be physically combined into more complex blocks, units and/or modules without departing from the scope of the inventive concept.

However, the present disclosure is not limited to the following embodiments and may be modified into various forms. Each embodiment to be described below may be implemented alone, or combined with at least another embodiment to make various combinations of embodiments.

Figure 2:
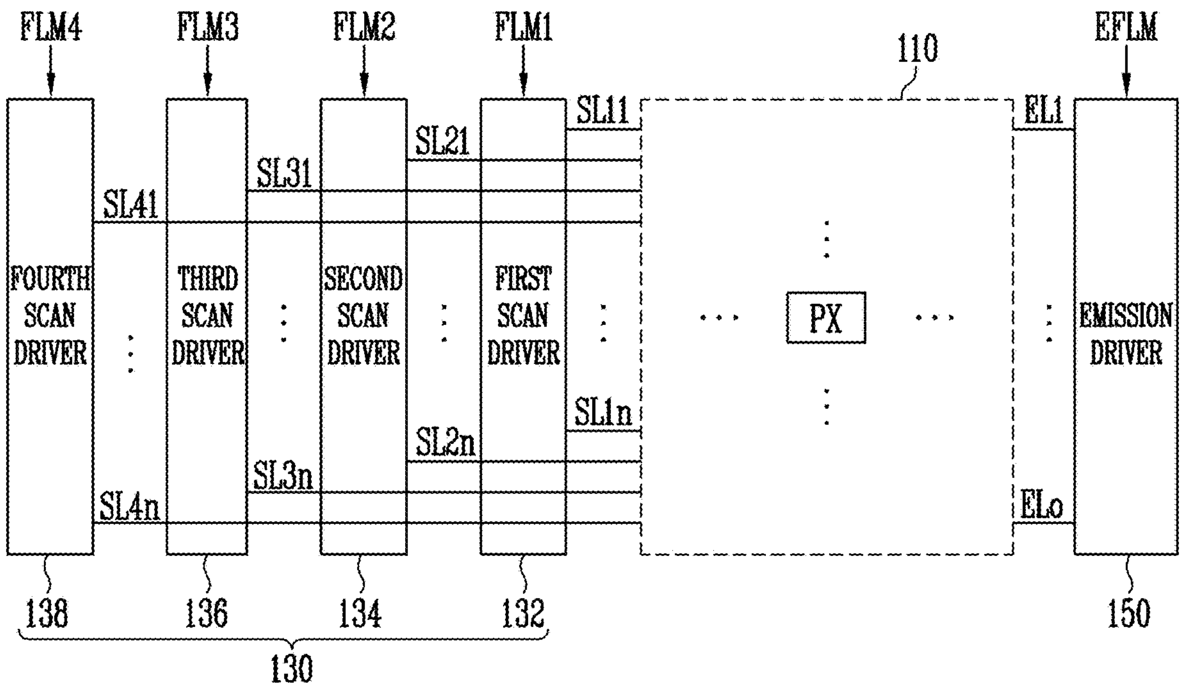
FIG. 2 is a diagram illustrating an embodiment of a scan driver and an emission driver that are illustrated in FIG. 1.

FIG. 1 is a diagram illustrating a display device in accordance with an embodiment of the present disclosure. FIG. 2 is a diagram illustrating an embodiment of a scan driver 130 and an emission driver 150 that are illustrated in FIG. 1.

Referring to FIG. 1, a display device 100 in accordance with an embodiment of the present disclosure may include a pixel component 110 (or a display panel), a timing controller 120 (e.g., a control circuit), the scan driver 130 (e.g., a first driver circuit), a data driver 140 (e.g., a second driver circuit), the emission driver 150 (e.g., a third driver circuit), and a power supply 160 (e.g., a power supply circuit). The aforementioned components may be implemented as separate integrated circuits. Two or more components of the aforementioned components may be implemented into a single integrated circuit. Furthermore, the scan driver 130 and/or the emission driver 150 may be formed in the pixel component 110.

The pixel component 110 may include pixels PX that are connected to first scan lines SL11, SL12, . . . , and SL1*n*, second scan lines SL21, SL22, . . . , and SL2*n*, third scan lines SL31, SL32, . . . , and SL3*n*, fourth scan lines SL41, SL42, . . . , and SL4*n*, data lines DL1, DL2, . . . , and DLm, emission control lines EL1, EL2, . . . , and ELo, a control line CL, and power lines PL1, PL2, PL3, and PL4 (where n, m, and o are integer numbers of 0 or more).

For example, a pixel PXij (refer to FIG. 3) positioned on an i-th horizontal line (or pixel row) and a j-th vertical line (or pixel column) may be connected to an i-th first scan line SL1*i*, an i-th second scan line SL2*i*, an i-th third scan line SL3*i*, an i-th fourth scan line SL4*i*, a k-th emission control line ELk, a control line CL, and j-th data line DLj (where i is an integer of n or less, j is an integer of m or less, and k is an integer of o or less). Here, k is a number identical to or less than i. For example, in the case where each of the emission control lines EL1 to ELo is connected to pixels PX positioned on one horizontal line, k is a number identical to i. For example, in the case where each of the emission control lines EL1 to ELo is connected to pixels PX positioned on two or more horizontal lines, k is a number less than i.

The pixels PX may be selected on a horizontal line basis {e.g., pixels PX connected to the same scan line may be grouped into one horizontal line (or pixel row)} when a first scan signal is supplied to the first scan lines SL11 to SL1*n*. Each of the pixels PX that are selected by the first scan signal may receive a data signal from a corresponding data line (any one of DL1 to DLm) connected therewith. The pixels PX that receive data signals may generate light having a certain luminance in response to voltages of the data signals.

The scan driver 130 may receive a scan driving control signal SCS from the timing controller 120. The scan driving signal SCS may include at least one scan start signal and clock signals required for driving the scan driver 130. The scan driver 130 may generate a first scan signal, a second scan signal, a third scan signal, and a fourth scan signal while shifting the scan start signal in response to the clock signals.

As illustrated in FIG. 2, the scan driver 130 may include a first scan driver 132, a second scan driver 134, a third scan driver 136, and a fourth scan driver 138.

The first scan driver 132 may receive a first scan start signal FLM1 to generate first scan signals while shifting the first scan start signal FLM1 in response to a clock signal. The first scan driver 132 may sequentially supply the first scan signals to the first scan lines SL11 to SL1*n*.

The second scan driver 134 may receive a second scan start signal FLM2 to generate second scan signals while shifting the second scan start signal FLM2 in response to a clock signal. The second scan driver 134 may sequentially supply the second scan signals to the second scan lines SL21 to SL2*n*.

The third scan driver 136 may receive a third scan start signal FLM3 to generate third scan signals while shifting the third scan start signal FLM3 in response to a clock signal. The third scan driver 136 may sequentially supply the third scan signals to the third scan lines SL31 to SL3*n*.

The fourth scan driver 138 may receive a fourth scan start signal FLM4 to generate fourth scan signals while shifting the fourth scan start signal FLM4 in response to a clock signal. The fourth scan driver 138 may sequentially supply the fourth scan signals to the fourth scan lines SL41 to SL4*n*. Each of the first scan signals, the second scan signals, the third scan signals, and the fourth scan signals may be set to a gate-on voltage to cause the transistors included in the pixels PX to be turned on.

For example, a first scan signal, a second scan signal, a third scan signal, and a fourth scan signal of a low level may be supplied to a P-type transistor. A first scan signal, a second scan signal, a third scan signal, and a fourth scan signal of a high level may be supplied to an N-type transistor. The transistor supplied with the first scan signal, the second scan signal, the third scan signal, or the fourth scan signal may be turned on in response to the first scan signal, the second scan signal, the third scan signal, or the fourth scan signal. The supply of the first scan signal, the second scan signal, the third scan signal, or the fourth scan signal may mean that a gate-on voltage is supplied to the first scan line SL1, the second scan line SL2, the third scan line SL3, or the fourth scan line SL4. Non-supply of the first scan signal, the second scan signal, the third scan signal, or the fourth scan signal may mean that a gate-off voltage is supplied to the first scan line SL1, the second scan line SL2, the third scan line SL3, or the fourth scan line SL4.

Although FIG. 2 illustrates that the first scan driver 132, the second scan driver 134, the third scan driver 136, and the fourth scan driver 138 are respectively connected with the first scan line SL1, the second scan line SL2, the third scan line SL3, and the fourth scan line SL4, embodiments of the present disclosure are not limited thereto. For example, the first scan line SL1*i*, the second scan line SL2*i*, and the fourth scan line SL4*i* may be set as the same scan line. In this case, the second scan driver 134 and the fourth scan driver 138 may be omitted.

The data driver 140 may receive output data Dout and a data driving signal DCS from the timing controller 120. The data driving signal DCS may include a sampling signal and/or timing signals required for driving the data driver 140. The data driver 140 may generate data signals, based on the data driving signal DCS and the output data Dout. For example, the data driver 140 may generate an analog data signal, based on a grayscale value of the output data Dout. The data driver 140 may supply data signals in units of one horizontal period.

The emission driver 150 may receive an emission driving signal ECS from the timing controller 120. The emission driving signal ECS may include an emission start signal and clock signals used for driving the emission driver 150. The emission driver 150 may generate emission control signals EM while shifting the emission start signal in response to a clock signal.

As illustrated in FIG. 2, the emission driver 150 may receive an emission start signal EFLM, and generate emission control signals EM while shifting the emission start signal EFLM in response to a clock signal. The emission driver 150 may successively supply the emission control signals to the emission control lines EL1 to ELo. The emission control signal may be set to a gate-off voltage, thus allowing transistors included in the pixels PX to be turned off.

For instance, an emission control signal to be supplied to a P-type transistor may be set to a high level, and an emission control signal to be supplied to an N-type transistor may be set a low level. A transistor supplied with an emission control signal may be turned off in response to the emission control signal. Thereafter, the supply of the emission control signal may mean that a gate-off voltage is supplied to the emission control line EL. Non-supply of the emission control signal may indicate that a gate-on voltage is supplied to the emission control line EL.

The timing controller 120 may receive input data Din and a control signal CS from a host system through an interface. For example, the timing controller 120 may receive input data Din and a control signal CS from at least one of a graphics processing unit (GPU), a central processing unit (CPU), and an application processor (AP) that are included in the host system. The control signal CS may include various signals including a clock signal.

The timing controller 120 may generate a scan driving signal SCS, a data driving signal DCS, and an emission driving signal ECS, based on the control signal CS. The scan driving signal SCS, the data driving signal DCS, and the emission driving signal ECS may be respectively supplied to the scan driver 130, the data driver 140, and the emission driver 150.

The timing controller 120 may convert the input data Din into a format to match specifications of the display device 100. Furthermore, the timing controller 120 may correct the input data Din to generate output data Dout, and supply the output data Dout to the data driver 140. In an embodiment, the timing controller 120 may correct the input data Din in response to optical measurement results obtained during the manufacturing process.

The timing controller 120 may supply a luminance control signal CB to the control line CL in response to the driving mode of the display device 100. For example, the timing controller 120 may supply a luminance control signal CB having an enabled state or a luminance control signal CB having a disabled state in response to the driving mode. Here, the luminance control signal CB having the enabled state may mean that a gate-on voltage is supplied to the control line CL. The luminance control signal CB having the disabled state may mean that a gate-off voltage is supplied to the control line CL. In addition, the control line CL may be connected in common to the pixels PX.

The driving mode of the display device 100 may include a first mode and a second mode. The first mode may refer to a mode in which the maximum luminance of the pixel component 110 is set to a first luminance. The second mode may refer to a mode in which the maximum luminance of the pixel component 110 is set to a second luminance higher than the first luminance. The timing controller 120 may supply the luminance control signal CB having the disabled state when the display device 100 is driven in the first mode, and may supply the luminance control signal CB having the enabled state when the display device 100 is driven in the second mode.

In an embodiment, the driving mode may change according to settings of a user. For example, the user may change the driving mode by adjusting the maximum luminance of the display device 100. In an embodiment, the driving mode may automatically change depending on the external brightness. For example, in the case where the display device 100 is used in relatively bright surroundings, the display device 100 may be set to the second mode. In the case where the display device 100 is used in relatively dark surroundings compared to the second mode, the display device 100 may be set to the first mode.

Figure 13:
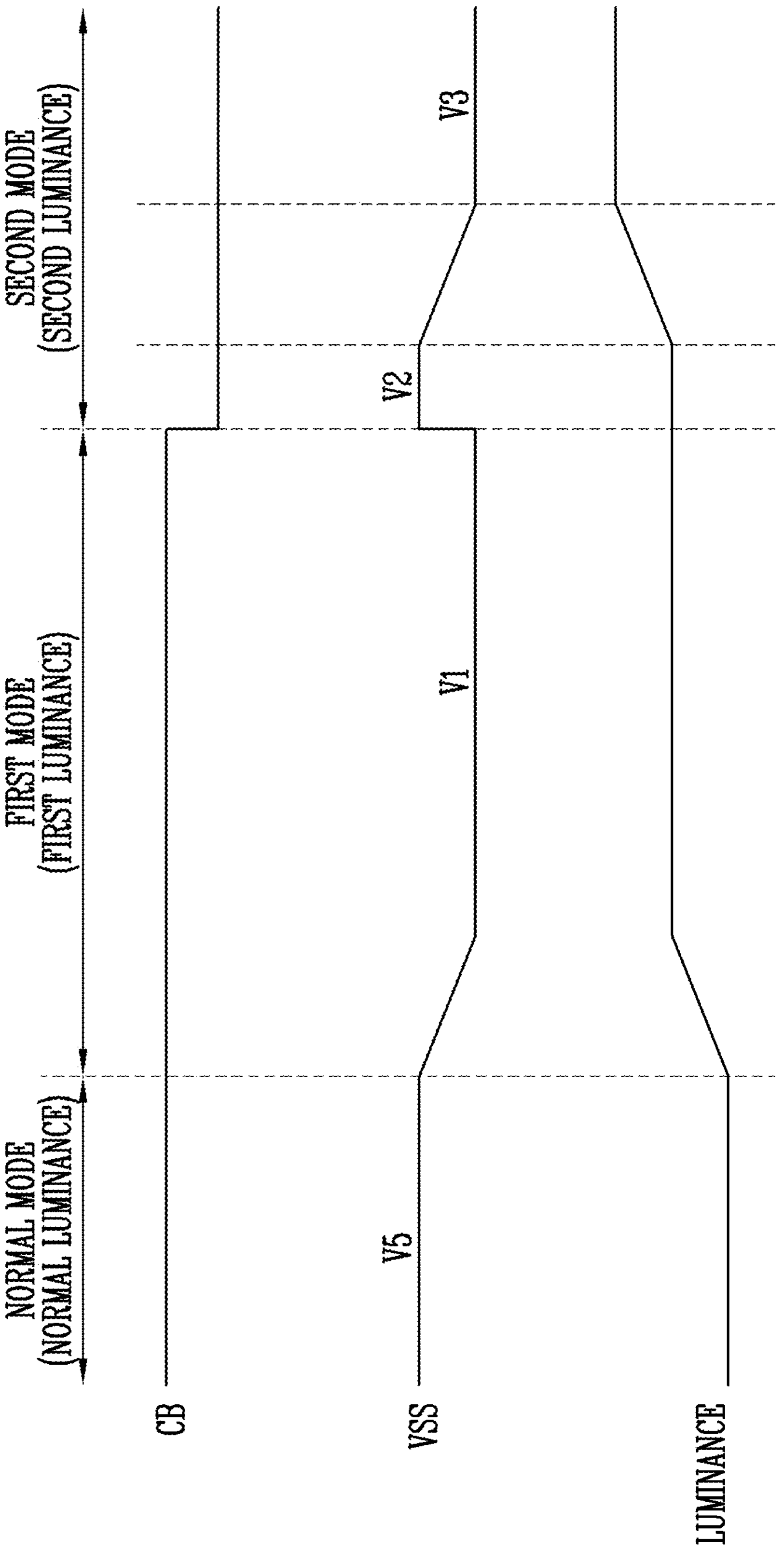
FIG. 13 is a diagram illustrating a driving mode of the display device.

In an embodiment, a driving mode signal corresponding to the driving mode is supplied from a host system (e.g., AP or the like) to the timing controller 120. The host system may supply a driving mode signal corresponding to the first mode or the second mode to the timing controller 120 in response to the settings of the user and/or external environment. In addition, as illustrated in FIG. 13, in the case where the driving mode of the display device includes a normal mode, a first mode, and a second mode, the host system may supply a driving mode signal corresponding to the normal mode, the first mode or the second mode to the timing controller 120.

The power supply 160 may generate various power voltages used for driving the display device 100. For example, the power supply 160 may generate a first driving power VDD, a second driving power VSS, a first initialization power Vint1, and a second initialization power Vint2.

The first driving power VDD may be provided to supply driving current to the pixels PX. The second driving power VSS may be provided to receive the driving current from the pixels PX. During a period in which the pixels PX are set to a light-emitting state, the first driving power VDD may be set to a voltage higher than that of the second driving power VSS.

The first initialization power Vint1 may be provided to initialize a gate electrode of a driving transistor included in each of the pixels PX. The second initialization power Vint2 may be provided to initialize a first electrode (or an anode electrode) of a light emitting element LD (refer to FIG. 3) included in each of the pixels PX.

Generated from the power supply 160, the first driving power VDD may be supplied to the first power line PL1, the second driving power VSS may be supplied to the second power line PL2, the first initialization power Vint1 may be supplied to the third power line PL3, and the second initialization power Vint2 may be supplied to the fourth power line PL4. The first power line PL1, the second power line PL2, the third power line PL3, and the fourth power line PL4 may be connected in common to the pixels PX, but embodiments of the present disclosure are not limited thereto.

In an embodiment, the first power line PL1 may be configured of a plurality of power lines. The power lines may be connected to different pixels PX. In an embodiment, the second power line PL2 may be configured of a plurality of power lines. The power lines may be connected to different pixels PX. In an embodiment, the third power line PL3 may be configured of a plurality of power lines. The power lines may be connected to different pixels PX. In an embodiment, the fourth power line PL4 may be configured of a plurality of power lines. The power lines may be connected to different pixels PX. In other words, in an embodiment of the present disclosure, the pixels PX may be connected to any one of the first power lines PL1, any one of the second power lines PL2, any one of the third power lines PL3, and any one of the fourth power lines PL4.

The power supply 160 may change the voltage of the second driving power VSS when the driving mode changes from the first mode to the second mode. For example, the power supply 160 may increase the voltage of the second driving power VSS when the driving mode changes from the first mode to the second mode, and then gradually reduce the voltage of the second driving power VSS after a certain period of time.

The power supply 160 may change the voltage of the first initialization power Vint1 when the driving mode changes from the first mode to the second mode. For example, the power supply 160 may increase the voltage of the first initialization power Vint1 when the driving mode changes from the first mode to the second mode, and then gradually reduce the voltage of the first initialization power Vint1 after a certain period of time.

The power supply 160 may change the voltage of the second driving power VSS when the driving mode changes from the second mode to the first mode. For example, the power supply 160 may reduce the voltage of the second driving power VSS when the driving mode changes from the second mode to the first mode, and then gradually increase the voltage of the second driving power VSS after a certain period of time.

The power supply 160 may change the voltage of the first initialization power Vint1 when the driving mode changes from the second mode to the first mode. For example, the power supply 160 may reduce the voltage of the first initialization power Vint1 when the driving mode changes from the second mode to the first mode, and then gradually increase the voltage of the first initialization power Vint1 after a certain period of time.

Figure 3:
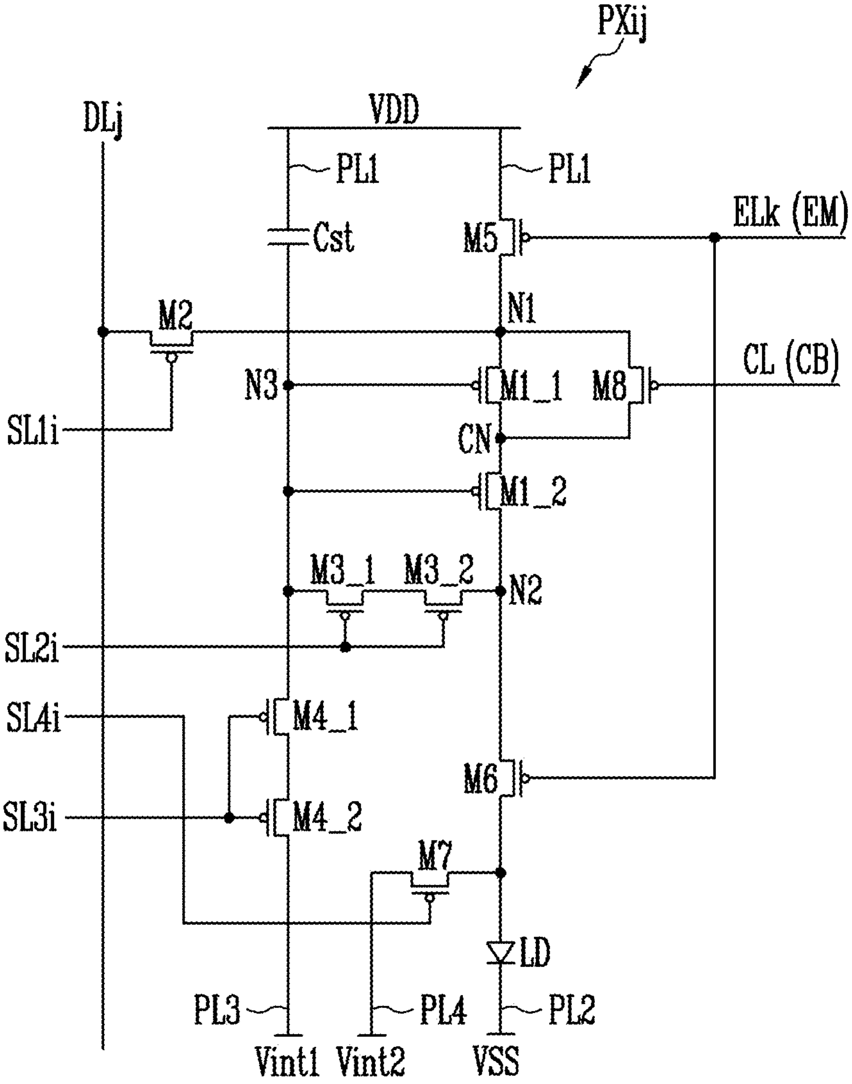
FIG. 3 is a diagram illustrating an embodiment of a pixel shown in FIG. 1.

FIG. 3 is a diagram illustrating an embodiment of a pixel shown in FIG. 1. FIG. 3 may represent the pixel positioned on an i-th horizontal line and a j-th vertical line.

Referring to FIG. 3, the pixel PXij in accordance with an embodiment of the present disclosure may be connected to corresponding signal lines SL1*i*, SL2*i*, SL3*i*, SL4*i*, ELk, DLj, and CL. In an embodiment, the pixel PXij may be also connected to the first power line PL1, the second power line PL2, the third power line PL3, and the fourth power line PL4.

The pixel PXij in accordance with an embodiment of the present disclosure may include a light emitting element LD, and a pixel circuit configured to control the amount of current to be supplied to the light emitting element LD.

The light emitting element LD may be connected between the first power line PL1 and the second power line PL2. For example, a first electrode (or an anode electrode) of the light emitting element LD may be electrically connected to the first power line PL1 via a sixth transistor M6, a second node N2, a first transistor M1, a first node N1, and a fifth transistor M5. A second electrode (or a cathode electrode) of the light emitting element LD may be electrically connected to the second power line PL2. The light emitting element LD may generate light of a certain luminance corresponding to the amount of driving current that is supplied from the first power line PL1 to the second power line PL2 via the pixel circuit.

The light emitting element LD may be implemented by an organic light emitting diode. Further, the light emitting element LD may be implemented by an inorganic light emitting diode such as a micro light emitting diode (LED) or a quantum dot light emitting diode. The light emitting element LD may be an element formed of a combination of organic material and inorganic material. Although FIG. 3 illustrates that the pixel PXij includes a single light emitting element LD, the pixel PXij in an embodiment may include a plurality of light emitting elements LD. The plurality of light emitting elements LD may be connected in series, parallel or series-parallel to each other.

The pixel circuit may include a first transistor M1, a second transistor M2, a third transistor M3, a fourth transistor M4, a fifth transistor M5, a sixth transistor M6, a seventh transistor M7, an eighth transistor M8, and a storage capacitor Cst.

The first transistor M1 (or the driving transistor) may include a first electrode connected to a first node N1, and a second electrode connected to a second node N2. A gate electrode of the first transistor M1 may be connected to a third node N3. For example, the gate electrode may be electrically connected to the third node N3. The first transistor M1 may control, in response to the voltage of a third node N3, the amount of current to be supplied from the first driving power supply VDD to the second driving power supply VSS via the light emitting element LD.

In an embodiment, the first transistor M1 includes a 1_1-th sub-transistor M1_1 and a 1_2-th sub-transistor M1_2. The 1_1-th sub-transistor M1_1 and the 1_2-th sub-transistor M1_2 may be connected in series between the first node N1 and the second node N2.

The 1_1-th sub-transistor M1_1 may include a first electrode connected to the first node N1, and a second electrode connected to a common node CN between the 1_1-th sub-transistor M1_1 and the 1_2-th sub-transistor M1_2. A gate electrode of the 1_1-th sub-transistor M1_1 may be connected to the third node N3.

The 1_2-th sub-transistor M1_2 may include a first electrode connected to the common node CN, and a second electrode connected to the second node N2. A gate electrode of the 1_2-th sub-transistor M1_2 may be connected to the third node N3.

The second transistor M2 may be connected between the data line DLj and the first node N1. A gate electrode of the second transistor M2 may be electrically connected to the first scan line SL1*i*. The second transistor M2 may be turned on and electrically connect the data line DLj to the first node N1 when a first scan signal of a low voltage (or an enable first scan signal) is supplied to the first scan line SL1*i*.

The third transistor M3 may be connected between the third node N3 and the second node N2. A gate electrode of the third transistor M3 may be electrically connected to the second scan line SL2*i*. The third transistor M3 may be turned on and electrically connect the third node N3 to the second node N2 when a second scan signal of a low voltage (or an enable second scan signal) is supplied to the second scan line SL2*i*. If the third transistor M3 is turned on, the first transistor M1 may be connected in the form of a diode.

In an embodiment, the third transistor M3 includes a 3_1-th sub-transistor M3_1 and a 3_2-th sub-transistor M3_2. In the case where the third transistor M3 includes a plurality of sub-transistors (e.g., M3_1 and M3_2), leakage of current from the third node N3 may be minimized. The 3_1-th sub-transistor M3_1 and the 3_2-th sub-transistor M3_2 may be connected in series between the third node N3 and the second node N2. Respective gate electrodes of the 3_1-th sub-transistor M3_1 and the 3_2-th sub-transistor M3_2 may be electrically connected to the second scan line SL2*i*.

The fourth transistor M4 may include a first electrode connected to the third node N3, and a second electrode electrically connected to the third power line PL3. A gate electrode of the fourth transistor M4 may be electrically connected to the third scan line SL3*i*. The fourth transistor M4 may be turned on and supply the voltage of the first initialization power Vint1 to the third node N3 when a third scan signal of a low voltage (or an enable third scan signal) is supplied to the third scan line SL3*i*. In an embodiment, the first initialization power Vint1 is set to a voltage lower than that of a data signal to be supplied to the data line DLj.

In an embodiment, the fourth transistor M4 includes a 4_1-th sub-transistor M4_1 and a 4_2-th sub-transistor M4_2. In the case where the fourth transistor M4 includes a plurality of sub-transistors (e.g., M4_1 and M4_2), leakage of current from the third node N3 may be minimized. The 4_1-th sub-transistor M4_1 and the 4_2-th sub-transistor M4_2 may be connected in series between the third node N3 and the third power line PL3. Respective gate electrodes of the 4_1-th sub-transistor M4_1 and the 4_2-th sub-transistor M4_2 may be electrically connected to the third scan line SL3*i*.

The fifth transistor M5 may include a first electrode electrically connected to the first power line PL1, and a second electrode connected to the first node N1. A gate electrode of the fifth transistor M5 may be connected to the emission control line ELk. The fifth transistor M5 may be turned off when an emission control signal EM of a high voltage (or an emission control signal having a disabled state) is supplied to the emission control line ELk, and may be turned on when an emission control signal EM of a low voltage (or an emission control signal having a disabled state) is supplied to the emission control line ELk.

The sixth transistor M6 may be connected between the second node N2 and the first electrode of the light emitting element LD. A gate electrode of the sixth transistor M6 may be connected to the emission control line ELk. The sixth transistor M6 may be turned off when an emission control signal EM of a high voltage is supplied to the emission control line ELk, and may be turned on when an emission control signal EM of a low voltage is supplied to the emission control line ELk.

Although FIG. 3 illustrates that the fifth transistor M5 and the sixth transistor M6 are connected to the same emission control line ELk, the present disclosure is not limited thereto. In an embodiment, the fifth transistor M5 and the sixth transistor M6 may be connected to different emission control lines.

The seventh transistor M7 may include a first electrode connected to the first electrode of the light emitting element LD, and a second electrode electrically connected to the fourth power line PL4. A gate electrode of the seventh transistor M7 may be electrically connected to the fourth scan line SL4*i*. The seventh transistor M7 may be turned on to supply the voltage of the second initialization power supply Vint2 to the first electrode of light emitting element LD when a fourth scan signal of a low voltage (or an enable fourth scan signal) is supplied to the fourth scan line SL4*i*.

If the voltage of the second initialization power supply Vint2 is supplied to the first electrode of the light emitting element LD, a parasitic capacitor of the light emitting element LD may be discharged. As a residual voltage charged into the parasitic capacitor of the light emitting element LD is discharged (or removed), unintended faint emission may be prevented. Therefore, the black expression performance of the pixel PXij may be enhanced.

The eighth transistor M8 (or a control transistor) is connected between the first node N1 and the common node CN. In other words, the eighth transistor M8 is connected in parallel to the 1_1-th sub-transistor M1_1. For example, in the case where the first transistor M1 includes a plurality of sub-transistors, the eighth transistor M8 may be connected in parallel to some of the sub-transistors.

A gate electrode of the eighth transistor M8 may be electrically connected to the control line CL. The eighth transistor M8 may be turned on when a luminance control signal CB having an enabled state is supplied to the control line CL, and may be turned off when the luminance control signal CB having a disabled state is supplied to the control line CL.

If the eighth transistor M8 is turned off, the first node N1 and the common node CN may be electrically connected to each other by the 1_1-th sub-transistor M1_1. In this case, the 1_1-th sub-transistor M1_1 may control the amount of current flowing from the first node N1 to the common node CN in response to the voltage of the third node N3. In other words, in the case where the eighth transistor M8 is turned off, the 1_1-th transistor M1_1 may be driven as a driving transistor.

If the eighth transistor M8 is turned on, the first node N1 and the common node CN may be electrically connected to each other via the eighth transistor M8. In this case, the current supplied from the first node N1 to the common node CN may be provided via the eighth transistor M8 without passing through the 1_1-th sub-transistor M1_1. In other words, in the case where the eighth transistor M8 is turned on, the 1_1-th transistor M1_1 is not driven as a driving transistor. For example, the 1_1-th transistor M1_1 may be bypassed when the eighth transistor M8 is turned on.

The storage capacitor Cst may be connected between the first power line PL1 and the third node N3. The storage capacitor Cst may store a voltage applied to the third node N3.

Although in FIG. 3 each of the first to eighth transistors M1 to M8 is illustrated as being a P-type transistor, the present disclosure is not limited thereto. For example, at least one transistor of the first to eighth transistors M1 to M8 may be an N-type transistor.

Although in FIG. 3 the first transistor M1 has been described as including two sub-transistors M1_1 and M1_2, the present disclosure is not limited thereto. For example, the first transistor M1 may be configured by connecting three or more sub-transistors in series. In this case, the eighth transistor M8 may be connected in parallel to at least one or more sub-transistors. For example, when the first transistor M1 is configured by three sub-transistors, the eighth transistor M8 may be connected in parallel to two of the three sub-transistors.

Figure 4:
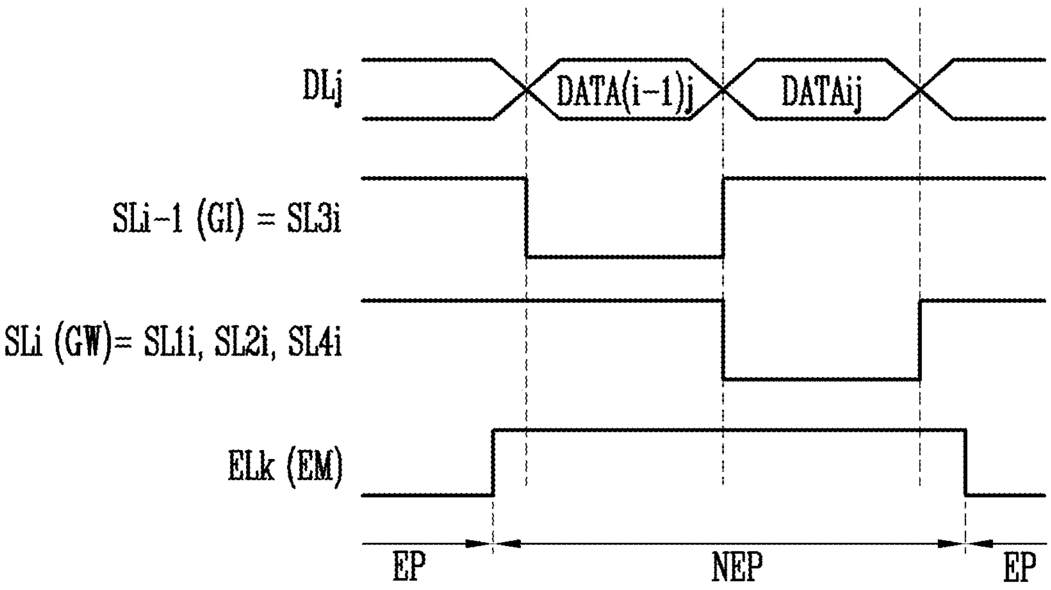
FIG. 4 is a waveform diagram illustrating an embodiment of a method of driving the pixel shown in FIG. 3.

FIG. 4 is a waveform diagram illustrating an embodiment of a method of driving the pixel shown in FIG. 3. In FIG. 4, for the convenience of explanation, it is assumed that each of the first scan line SL1*i*, the second scan line SL2*i*, and the fourth scan line SL4*i* is an i-th scan line SLi, and the third scan line SL3*i* is an i−1-th scan line SLi−1.

Referring to FIG. 4, first, an emission control signal EM of a high voltage is applied to the emission control line ELk. If the emission control signal EM of a high voltage is supplied to the emission control line ELk, the fifth transistor M5 and the sixth transistor M6 are turned off.

If the fifth transistor M5 is turned off, the first power line PL1 and the first node N1 are electrically disconnected. If the sixth transistor M6 is turned off, the second node N2 and the light emitting element LD may be electrically disconnected. Hence, the light emitting element LD may be set to a non-emission state during a non-emission period NEP.

After the emission control signal EM of a high voltage is supplied to the emission control line ELk, a voltage DATA (i−1) j of a data signal corresponding to an i−1-th horizontal line is applied to the data line DLj, and a scan signal GI is supplied to an i−1-th scan line SLi−1. Here, because the second transistor M2 is set to a turn-off state, the voltage DATA (i−1) j of the data signal corresponding to the i−1-th horizontal line is not applied to the pixel PXij.

If the scan signal GI is supplied to an i−1-th scan line SLi−1, the fourth transistor M4 is turned on. If the fourth transistor M4 is turned on, the voltage of the first initialization power Vint1 may be supplied to the third node N3 so that the third node N3 can be initialized.

Next, a voltage DATAij of a data signal corresponding to the i-th horizontal line is applied to the data line DLj, and a scan signal GW is supplied to the i-th scan line SLi. If the scan signal GW is supplied to the i-th scan line SLi, the second transistor M2, the third transistor M3, and the seventh transistor M7 are turned on.

If the third transistor M3 is turned on, the first transistor M1 may be connected in the form of a diode or diode-connected. If the second transistor M2 is turned on, the voltage DATAij of the data signal is supplied to the first node N1 of the pixel PXij. The voltage DATAij of the data signal supplied to the first node N1 may be supplied to third node N3 via the first transistor M1 connected in the form of a diode. Here, a voltage corresponding both to the voltage DATAij of the data signal and to the threshold voltage of the first transistor M1 may be applied to the third node N3. The storage capacitor Cst may store the voltage of the third node N3.

If the seventh transistor M7 is turned on, the voltage of the second initialization power Vint2 may be supplied to the first electrode of the light emitting element LD. The light emitting element LD may be initialized by the voltage of the second initialization power Vint2.

Subsequently, an emission control signal EM of a low voltage is supplied to the i-th emission control line ELk, so that the fifth transistor M5 and the sixth transistor M6 are turned on. In this case, a current path is formed connecting the first power line PL1, the first transistor M1, the sixth transistor M6, the light emitting element LD, and the second power line PL2.

The first transistor M1 may control, in response to a voltage stored in the storage capacitor Cst, the amount of current to be supplied from the first driving power supply VDD to the second driving power supply VSS via the light emitting element LD. The light emitting element LD may emit light at a luminance corresponding to the amount of current supplied from the first transistor M1 during an emission period EP. The light emitting element LD may emit light until an emission control signal EM of a high voltage is supplied to the emission control line ELk.

When an emission control signal EM of a low voltage is supplied, the pixel PXij may be in a display state. Therefore, a period during which the emission control signal EM of a low voltage is supplied may be referred to as an emission period EP. When the emission control signal EM of a high voltage is supplied, the pixel PXij may be in a non-display state. Therefore, a period during which the emission control signal EM of a high voltage is supplied may be referred to as a non-emission period NEP. Each frame period may include at least one or more non-emission periods NEP.

Figure 5A:
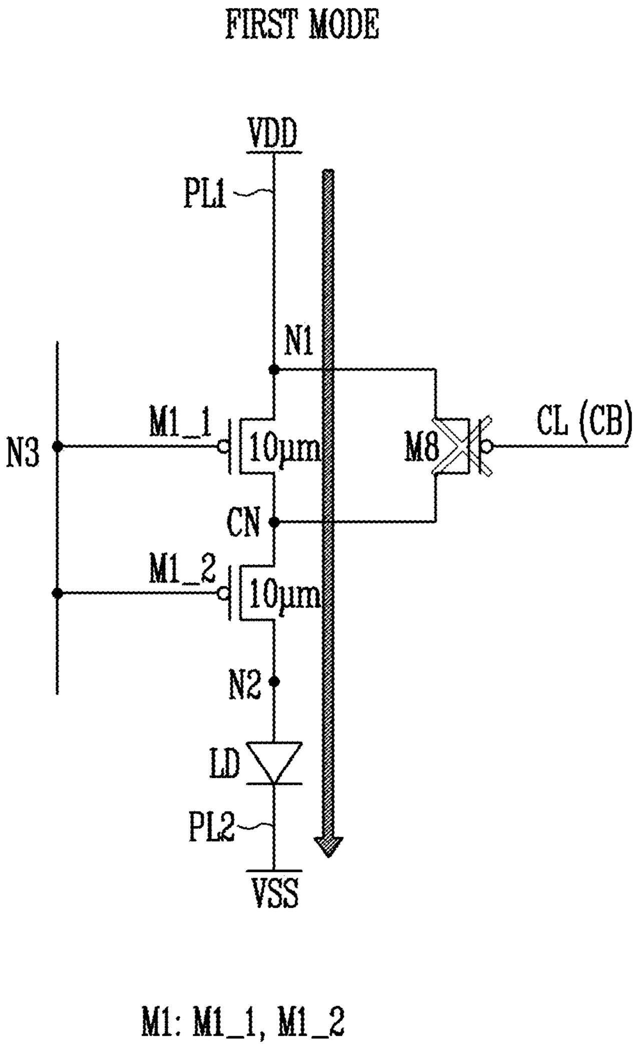
FIGS. 5A and 5B are diagrams illustrating channel lengths of a first transistor in response to luminance control signals.
Figure 5B:
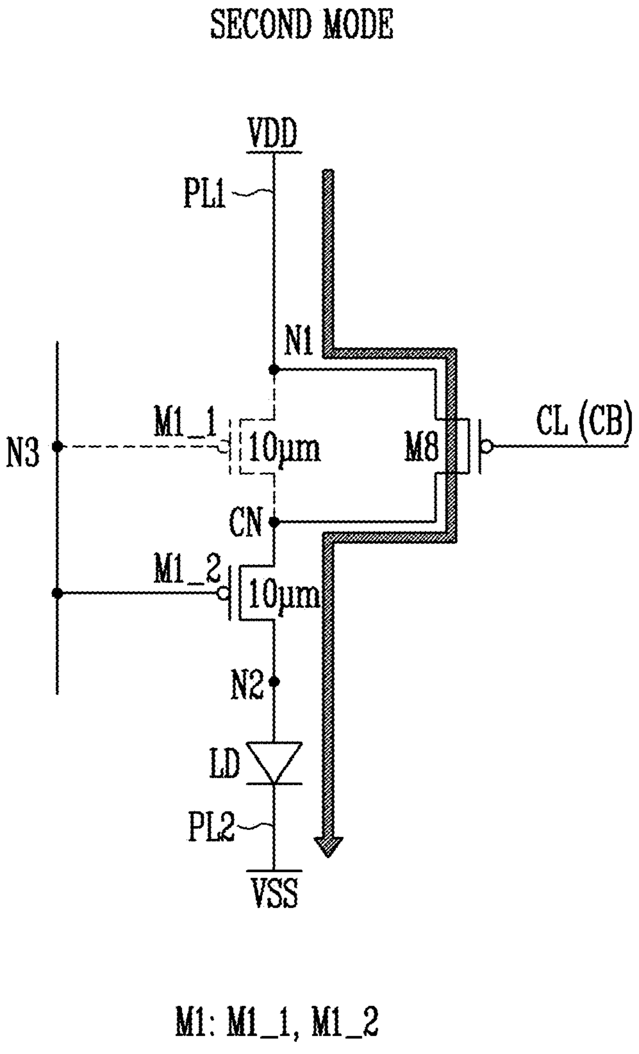

FIGS. 5A and 5B are diagrams illustrating channel lengths of the first transistor M1 in response to luminance control signals. FIGS. 5A and 5B represent the state where current is supplied to the light emitting element LD, and unnecessary components (e.g., the fifth transistor M5 and the sixth transistor M6 are not illustrated).

Referring to FIG. 5A, the timing controller 120 may supply a luminance control signal CB having a disabled state to the control line CL when the driving mode is set to the first mode. If the luminance control signal CB having the disabled state is supplied to the control line CL, the eighth transistor M8 is turned off.

If the eighth transistor M8 is turned off, the amount of current supplied from the first driving power VDD to the second driving power VSS via the light emitting element may be controlled by the 1_1-th sub-transistor M1_1 and the 1_2-th sub-transistor M1_2. When each of the 1_1-th sub-transistor M1_1 and the 1_2-th sub-transistor M1_2 has a channel length of 10 μm, a channel length of the first transistor M1 may be 20 μm.

In other words, in the case where the display device 100 is driven in the first mode, the first transistor M1 included in each of the pixels PX may have a channel length of 20 μm, and in response thereto, the amount of current to be supplied to the light emitting element LD may be controlled.

Referring to FIG. 5B, the timing controller 120 may supply a luminance control signal CB having an enabled state to the control line CL when the driving mode is set to the second mode. If the luminance control signal CB of the enabled state is supplied to the control line CL, the eighth transistor M8 is turned on.

If the eighth transistor M8 is turned on, the first node N1 and the common node CN may be electrically connected to each other. In this case, the amount of current supplied from the first driving power VDD to the second driving power VSS via the light emitting element LD may be controlled by the 1_2-th sub-transistor M1_2. Here, the channel length of the first transistor M1 may be 10 μm. For example, the channel length may be computed from the 1_2-th sub-transistor M1_2 without considering the 1_1-th sub-transistor M1_1.

In other words, in an embodiment of the present disclosure, the channel length of the first transistor M1 may be changed in response to the driving mode. In the case where the channel length of the first transistor M1 changes, the amount of current to be supplied to the light emitting element LD may change in response to the voltage of the third node N3.

For example, in the case where the channel length of the first transistor M1 is reduced, the amount of current to be supplied to the light emitting element LD may increase in response to the voltage of the third node N3. In an embodiment of the present disclosure, the channel length of the first transistor M1 is set to be short when the display device 100 is in the second mode so that the amount of current to be supplied to the light emitting element LD can be increased.

The timing controller 120 may supply a luminance control signal CB having a disabled state when the display device 100 is driven in the first mode, whereby the maximum luminance of the pixel component 110 may be set to a first luminance. The timing controller 120 may supply a luminance control signal CB having an enabled state when the display device 100 is driven in the second mode, whereby the maximum luminance of the pixel component 110 may be set to a second luminance higher than a first luminance.

In other words, in an embodiment of the present disclosure, the channel length of the first transistor M1 may be changed in response to the driving mode, whereby the luminance of the pixel component 110 can be controlled.

Figure 6A:
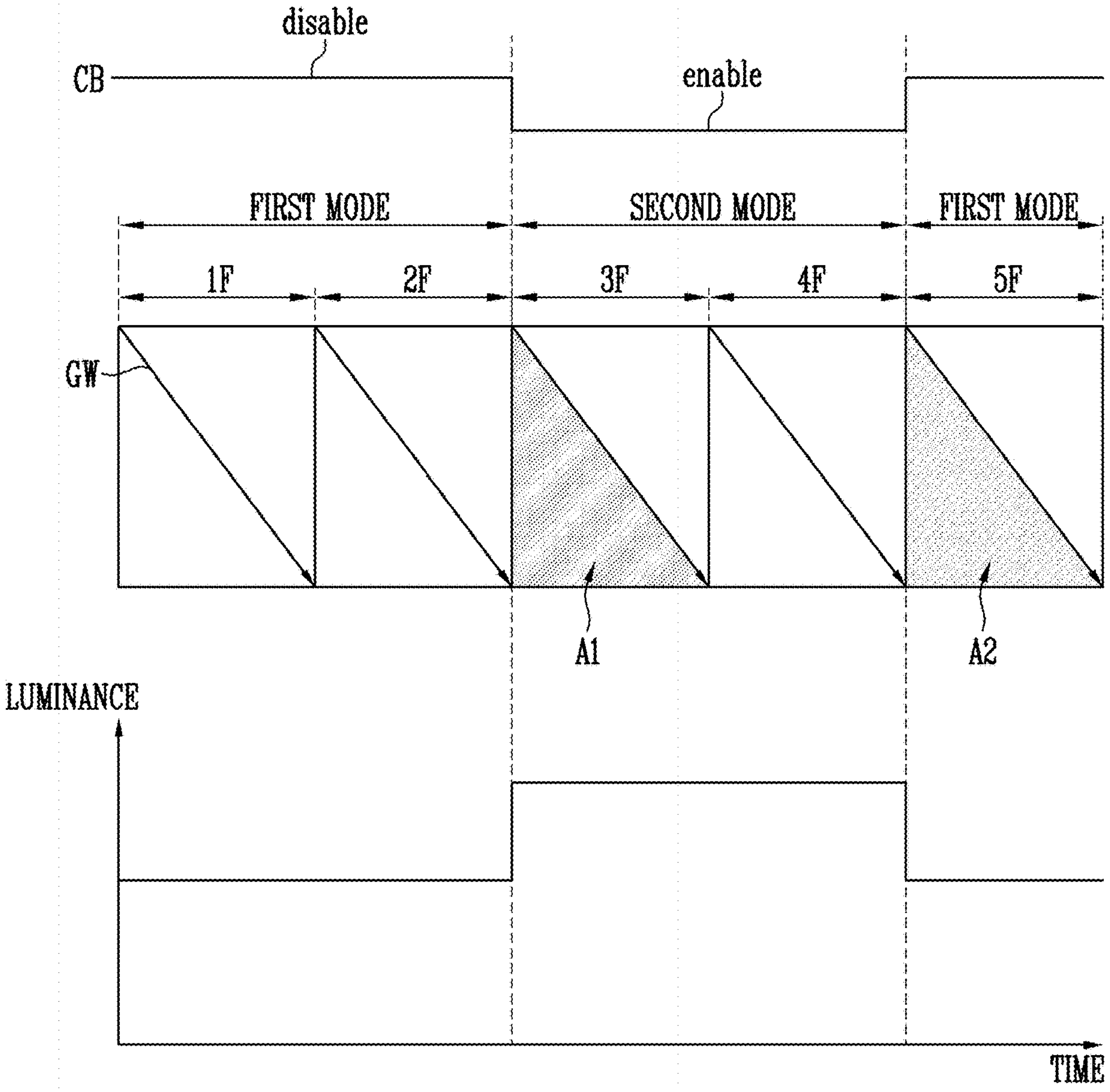
FIGS. 6A and 6B are diagrams illustrating a mode change process in response to a luminance control signal.
Figure 6B:
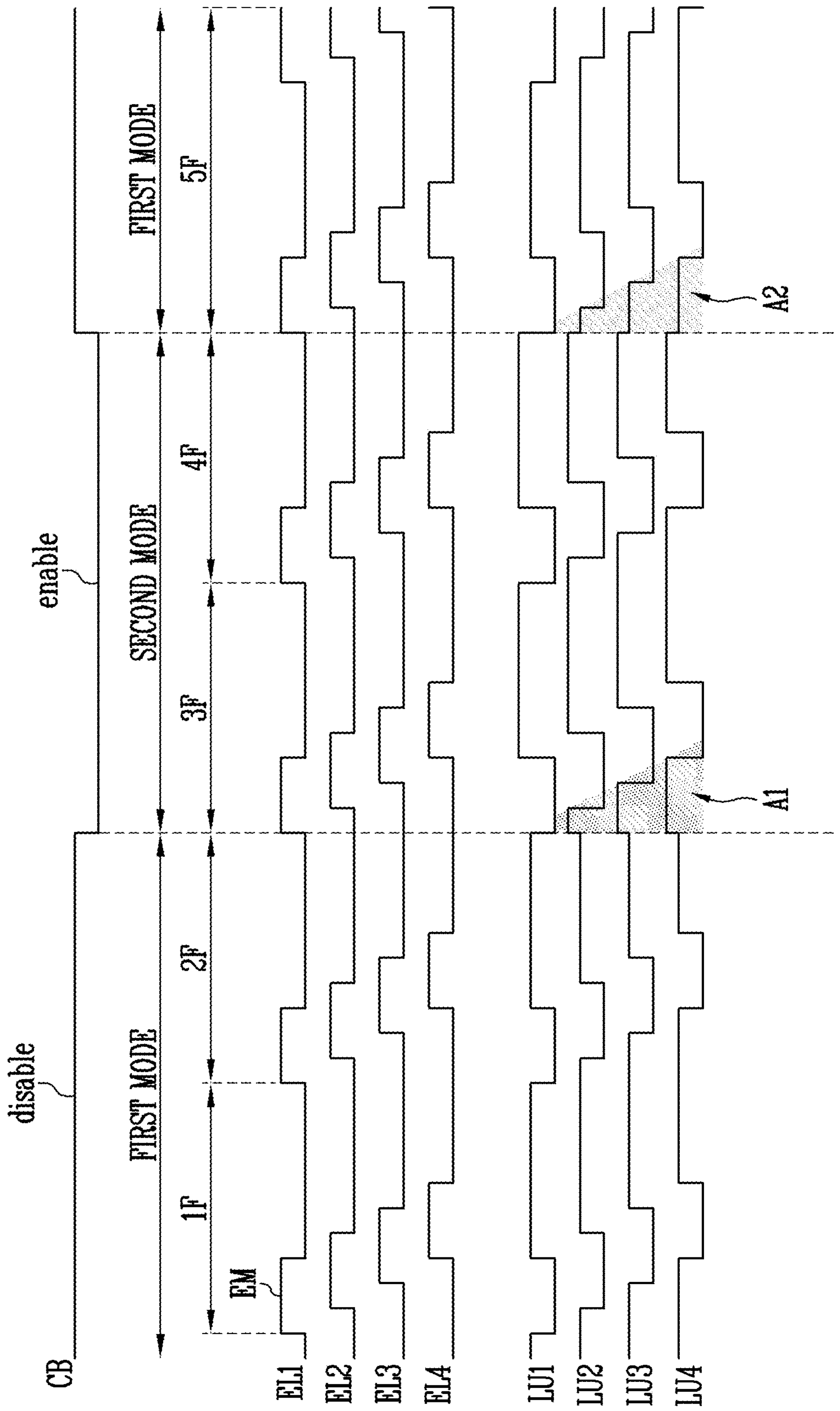

FIGS. 6A and 6B are diagrams illustrating a mode change process corresponding to a luminance control signal. In FIG. 6B, for the convenience of explanation, there are illustrated four emission control lines EL1, EL2, EL3, and EL4. In FIG. 6B, reference LU1 represents the luminance of a first horizontal line on which the first emission control line EL1 is positioned. Likewise, references LU2, LU3, and LU4 represent a second horizontal line, a third horizontal line, and a fourth horizontal line on which the second emission control line EL2, the third emission control line EL3, and the fourth emission control line EL4 are positioned. In FIG. 6A, the diagonal arrow included in each of the frame periods indicates the sequential supply of the scan signals GW.

Referring to FIGS. 6A and 6B, the scan signals GW may be sequentially supplied to the scan lines during a frame period. Further, the emission control signals EM may be sequentially supplied to the emission control lines EL1 to EL4 during the frame period.

If the scan signals GW are sequentially supplied to the scan lines, the pixels PX are selected on a horizontal line basis, and voltages of data signals may be supplied to pixels PX selected by the corresponding scan signal GW. Thereafter, the pixels PX may emit light in such a way that the supply of the emission control signals EM are sequentially interrupted.

In response to the settings of the user and/or external environment, the driving mode of the display device 100 may change from the first mode to the second mode. For example, when the frame of the display device 100 changes from a second frame 2F to a third frame 3F, a luminance control signal CB having an enabled state may be supplied to the control line CL.

If the luminance control signal CB having the enabled state is supplied to the control line CL, the channel length of the first transistor M1 included in each of the pixels PX may decrease, whereby the luminance of each of the pixels PX may increase. If the luminance control signal CB having the enabled state is supplied to the control line CL, the luminance of the pixels PX momentarily increases, and changes in luminance of the pixel component 110 may be perceived by the user in the form of flickering.

Further, in the case where driving mode of the display device 100 changes from the first mode to the second mode, some pixels (e.g., pixels emitting light in area A1) may generate light of a luminance higher than a desired luminance. In other words, as illustrated in FIG. 6B, in the case where the luminance control signal CB having the enabled state is supplied to the control line CL during the third frame 3F, the luminance of some pixels that emit light in response to data signals in the second frame 2F may increase. For example, the luminance of the pixels positioned on the second horizontal line, the third horizontal line, and the fourth horizontal line may increase.

In response to the settings of the user and/or external environment, the driving mode of the display device 100 may change from the second mode to the first mode after a fourth frame 4F. For example, when changing from the fourth frame 4F to the fifth frame 5F, a luminance control signal CB having the disabled state may be supplied to the control line CL.

If the luminance control signal CB having the disabled state is supplied to the control line CL, the channel length of the first transistor M1 included in each of the pixels PX may increase, whereby the luminance of each of the pixels PX may decrease. If the luminance control signal CB having the disabled state is supplied to the control line CL, the luminance of the pixels PX may momentarily decrease.

Further, in the case where a driving mode of the display device 100 changes from the second mode to the first mode, some pixels (e.g., pixels emitting light in area A2) may generate light of a luminance lower than a desired luminance. In other words, as illustrated in FIG. 6B, in the case where the luminance control signal CB having the disabled state is supplied to the control line CL during the fifth frame 5F, the luminance of some pixels that emit light in response to data signals in the fourth frame 4F may decrease. For example, the luminance of the pixels positioned on the second horizontal line, the third horizontal line, and the fourth horizontal line may decrease.

Figure 7:
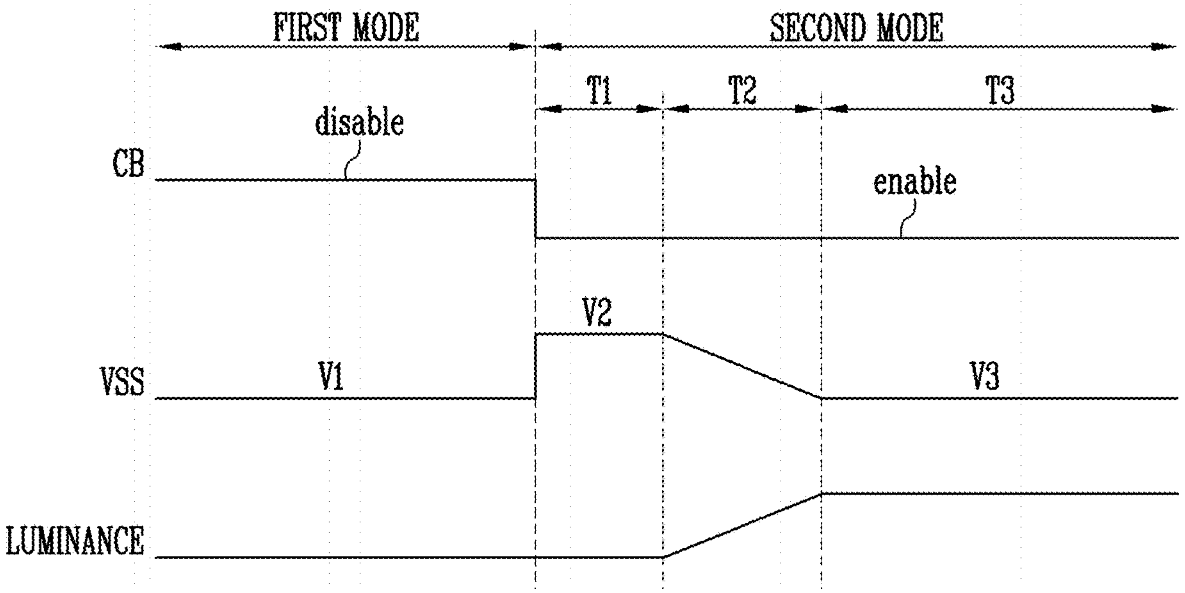
FIG. 7 is a diagram illustrating a mode change process in accordance with an embodiment of the present disclosure.

FIG. 7 is a diagram illustrating a mode change process in accordance with an embodiment of the present disclosure.

Referring to FIGS. 1 and 7, when the driving mode of the display device 100 changes from the first mode to the second mode, the timing controller 120 supplies a luminance control signal CB having an enabled state to the control line CL. The power supply 160 may increase the voltage of the second driving power VSS when the driving mode of the display device 100 changes from the first mode to the second mode. The power supply 160 may increase the voltage of the second driving power VSS in response to receiving the enable luminance control signal CB having the enabled state or a signal corresponding thereto from the timing controller 120.

The power supply 160 may increase the voltage of the second driving power VSS from a first voltage V1 to a second voltage V2 when the driving mode of the display device 100 changes from the first mode to the second mode. For example, the power supply 160 may increase the voltage of the second driving power VSS at a first inclination (or slope). Here, the first inclination may be set to an inclination substantially similar to a right angle.

In the case where the voltage of the second driving power VSS increases from the first voltage V1 to the second voltage V2, the luminance of the pixels PX may be reduced. The decrement in luminance of the pixels PX corresponding to the increase in the second driving power VSS may be similar or identical to the increment in luminance corresponding to a change in channel length of the first transistor M1 included in each of the pixels PX.

Therefore, in the case where the second driving power VSS increases to the second voltage V2 when the luminance control signal CB having the enabled state is supplied, the luminance of the pixel component 110 may be maintained substantially at the same (or similar) luminance regardless of mode changes. The value of the second voltage V2 may be experimentally determined to allow the pixel component 110 (or the pixels) to maintain a constant luminance when changing from the first mode to the second mode.

After the voltage of the second driving power VSS has increased to the second voltage V2, the power supply 160 may maintain the second voltage V2 during a first period T1 (or a certain period of time). For example, the first period T1 may be set to a time of one frame or more. For example, the first period T1 may be set to a time of ten seconds or less. For example, the first period T1 may be experimentally determined in response to the type (e.g., resolution, size, or the like) of the display device 100.

The power supply 160 may reduce the voltage of the second driving power VSS from the second voltage V2 to a third voltage V3 with a second inclination during a second period T2 after the first period T1. The second inclination may be set to a gentler inclination compared to the first inclination. In other words, the power supply 160 may gradually reduce the voltage of the second driving power VSS from the second voltage V2 to the third voltage V3 during the second period T2.

In the case where the voltage of the second driving power VSS gradually decreases, the luminance of the pixel component 110 (or the pixels) may gradually increase. In other words, in an embodiment of the present disclosure, the luminance of the pixel component 110 may gradually increase when changing from the first mode to the second mode, thus preventing flickering or the like from being perceived by the viewer.

The power supply 160 may maintain the second driving power VSS at the third voltage V3 during a third period T3 after the second period T2. In the case where the second driving power VSS is maintained at the third voltage V3, the maximum luminance of the display device 100 may be set to the second luminance in response to the second mode.

In an embodiment, the second voltage V2 is a voltage higher than the first voltage V1 and the third voltage V3. In an embodiment, the third voltage V3 is a voltage that is substantially the same as the first voltage V1. In an embodiment, the third voltage V3 may be set to a voltage different from the first voltage V1. In an embodiment, the first voltage V1 may be set to enable the first luminance corresponding to the first mode to be implemented. The third voltage V3 may be experimentally determined to enable the second luminance corresponding to the second mode to be implemented.

Figure 8:
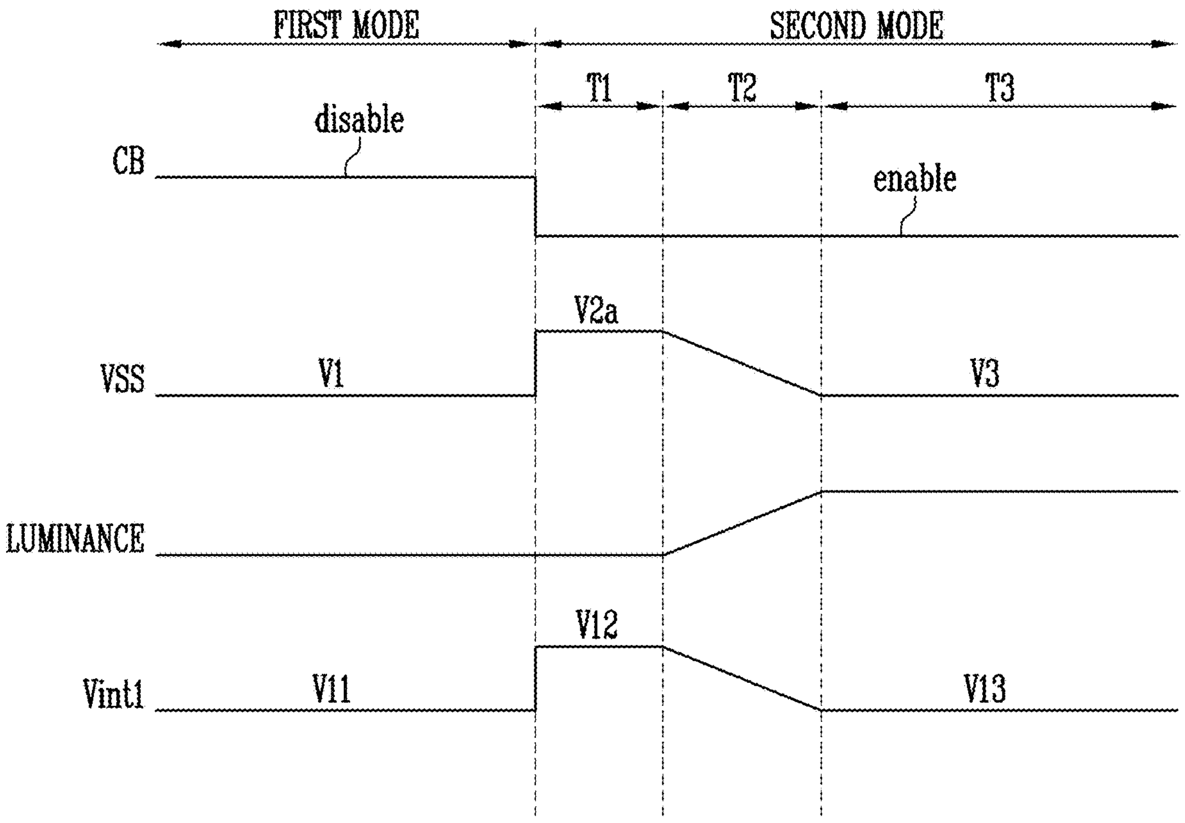
FIG. 8 is a diagram illustrating a mode change process in accordance with an embodiment of the present disclosure.

FIG. 8 is a diagram illustrating a mode change process in accordance with an embodiment of the present disclosure. In the following description of FIG. 8, explanations that overlap the description of FIG. 7 will be omitted.

Referring to FIG. 8, the power supply 160 may increase the voltage of the second driving power VSS from a first voltage V1 to a second voltage V2*a* when the driving mode of the display device 100 changes from the first mode to the second mode. Furthermore, the power supply 160 may increase the voltage of the first initialization power Vint1 from an 11-th voltage V11 (or a first initialization voltage) to a 12-th voltage V12 (or a second initialization voltage) when the driving mode of the display device 100 changes from the first mode to the second mode.

In the case where the voltage of the first initialization voltage Vint1 increases, the gate electrode of the first transistor M1 included in each of the pixels PX may be initialized to a high voltage (i.e., the 12-th voltage V12), whereby the luminance of the pixels PX may decrease. In the case where the voltage of the first initialization power Vint1 increases when the display device 100 changes from the first mode to the second mode, the second voltage V2*a* may be set to a voltage lower than the second voltage V2 shown in FIG. 7 (in other words, a voltage fluctuation range of the second driving power VSS may be reduced).

The decrement in luminance of the pixels PX corresponding to the increase in the second driving power VSS and the increase in the first initialization power Vint1 may be similar or identical to the increment in luminance corresponding to a change in channel length of the first transistor M1 included in each of the pixels PX. In this case, it is possible to prevent a rapid increase in the luminance of the pixel component 110 when the driving mode of the display device 100 changes from the first mode to the second mode.

For example, in the case where the second driving power VSS increases to the second voltage V2*a* and the first initialization power Vint1 increases to the 12-th voltage V12 when the luminance control signal CB having the enabled state is supplied, the luminance of the pixel component 110 may be maintained substantially at the same (or similar) luminance regardless of mode changes. For example, the value of the second voltage V2*a* and the value of the 12-th voltage V12 may be experimentally determined to allow the pixel component 110 (or the pixels) to maintain a constant luminance when changing from the first mode to the second mode.

The power supply 160 may maintain the second voltage V2*a* and the 12-th voltage V12 during the first period T1 (or a certain period of time) after the voltage of the second driving power VSS has increased to the second voltage V2*a* and the voltage of the first initialization power Vint1 has increased to the 12-th voltage V12.

The power supply 160 may gradually reduce the voltage of the second driving power VSS from the second voltage V2*a* to a third voltage V3 during a second period T2 after the first period T1. Furthermore, the power supply 160 may gradually reduce the voltage of the first initialization power Vint1 from the 12-th voltage V12 to a 13-th voltage V13 (or a third initialization voltage) during the second period T2.

In the case where the voltages of the second driving power VSS and the first initialization power Vint1 gradually decrease, the luminance of the pixel component 110 (or the pixels) may gradually increase. In other words, in an embodiment of the present disclosure, the luminance of the pixel component 110 may gradually increase when changing from the first mode to the second mode, thus preventing flickering or the like from being perceived by the viewer.

The power supply 160 may maintain the second driving power VSS at the third voltage V3 during a third period T3 after the second period T2. The power supply 160 may maintain the first initialization power Vint1 at the 13-th voltage V13 during the third period T3 after the second period T2.

In an embodiment, the 12-th voltage V12 is a voltage higher than the 11-th voltage V11 and the 13-th voltage V13. In an embodiment, the 13-th voltage V13 is a voltage that is substantially the same as the 11-th voltage V11. In an embodiment, the 13-th voltage V13 may a voltage different from the 11-th voltage V11.

Figure 9A:
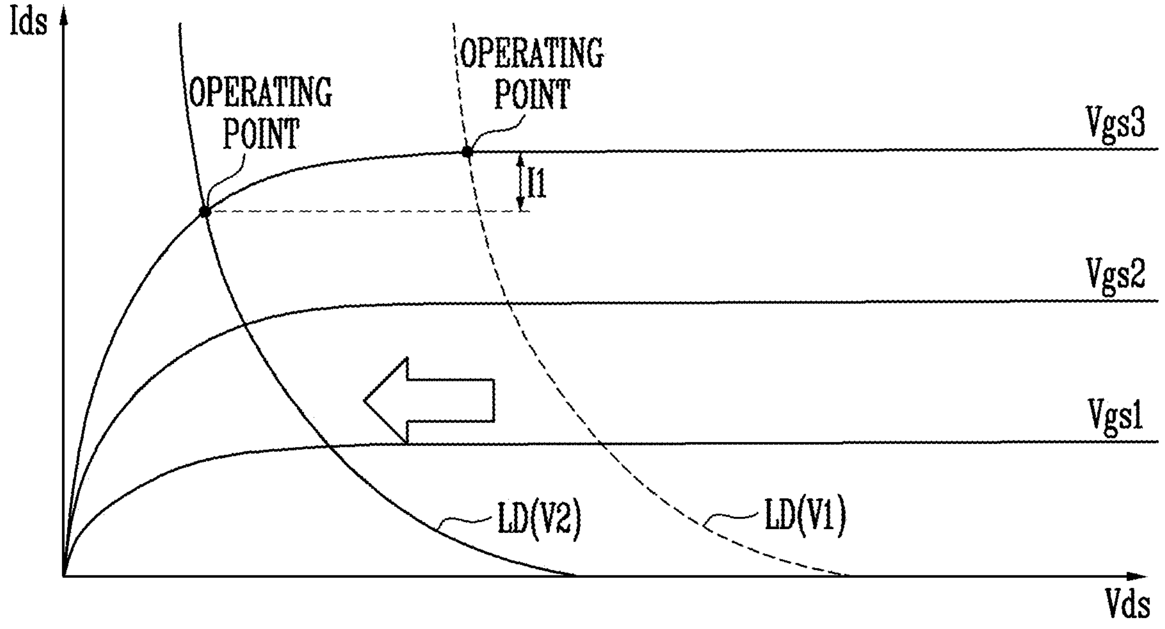
FIGS. 9A and 9B are diagrams illustrating a current change process of a first transistor in response to changes in a second driving power voltage.
Figure 9B:
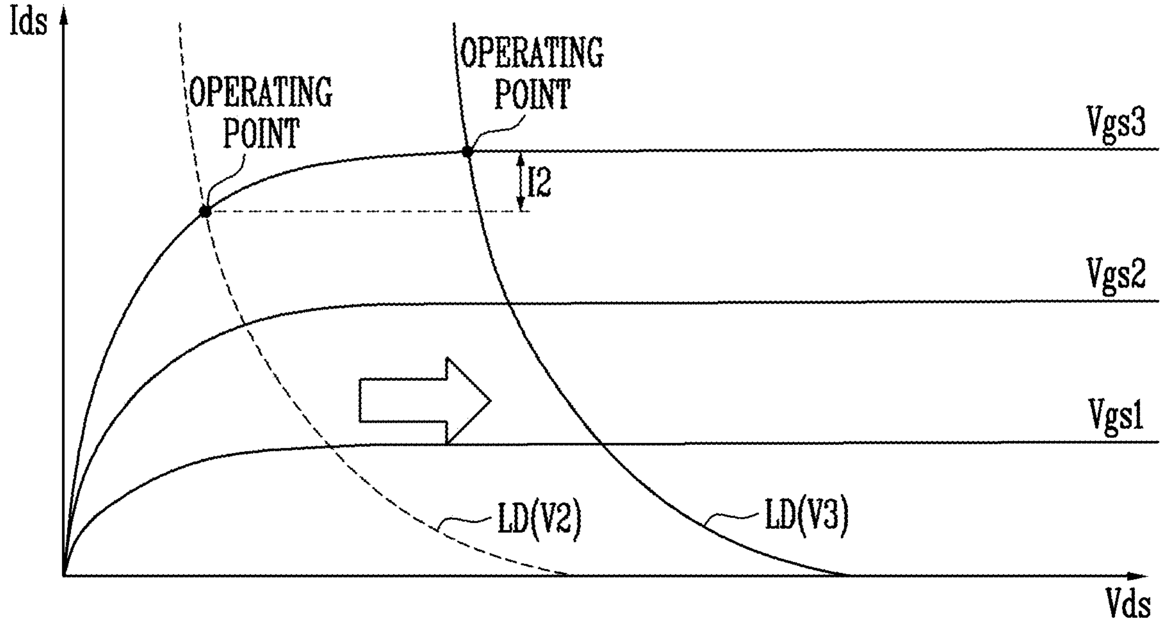

FIGS. 9A and 9B are diagrams illustrating a current change process of the first transistor M1 in response to changes in a second driving power voltage. In FIGS. 9A and 9B, the Y-axis of Ids represents the current flowing through the first transistor M1, and the X-axis of Vds represents the voltage between the first electrode and the second electrode of the first transistor M1. Vgs1, Vgs2, and Vgs3 refer to voltages between the gate electrode and the first electrode of the first transistor M1.

Referring to FIG. 9A, in the case where the voltage of the second driving power VSS changes from the first voltage V1 to the second voltage V2, a characteristic curve of the light emitting element LD shifts to the left in the graph. In the case where the characteristic curve of the light emitting element LD changes, the operating point changes in position, whereby the amount of current flowing from the first transistor M1 may decrease.

For example, assuming that a voltage of Vgs3 is applied between the gate electrode and the source electrode of the first transistor M1, when the voltage of the second driving power VSS changes from the first voltage V1 to the second voltage V2, the amount of current may decrease by first current I1. Here, the current amount of the first current I1 may be similar or identical to the increase in current amount in response to a change in the channel length of the first transistor M1 when changing from the first mode to the second mode. Therefore, even if the driving mode of the display device 100 changes from the first mode to the second mode, the pixel component 110 may maintain a constant luminance, thereby preventing a change in luminance due to the mode change from being perceived by the user.

Referring to FIG. 9B, in the case where the voltage of the second driving power VSS changes from the second voltage V2 to the third voltage V3, the characteristic curve of the light emitting element LD shifts to the right in the graph. In the case where the characteristic curve of the light emitting element LD changes, the operating point changes in position, whereby the amount of current flowing from the first transistor M1 may increase.

For example, assuming that a voltage of Vgs3 is applied between the gate electrode and the source electrode of the first transistor M1, when the voltage of the second driving power VSS changes from the first voltage V2 to the third voltage V3, the amount of current may increase by second current I2.

Here, the voltage of the second driving power VSS may gradually decrease from the second voltage V2 to the third voltage V3 during the second period T2. Accordingly, the amount of current flowing through the first transistor M1 may gradually increase, whereby the luminance of the pixel component 110 may gently increase.

In an embodiment, a process of correcting input data Din and generating output data Dout may be further included to enable a grayscale expression to be reliably implemented in response to changes in the characteristic curve of the light emitting element LD, as shown in FIGS. 9A and 9B. For example, in response to changes in the characteristic curve of the light emitting element LD, the luminance of the pixel component 110 may be measured, and the input data Din may be corrected (e.g., optically compensated) to enable the grayscale expression to be reliably implemented in response to the measurement results.

Figure 10:
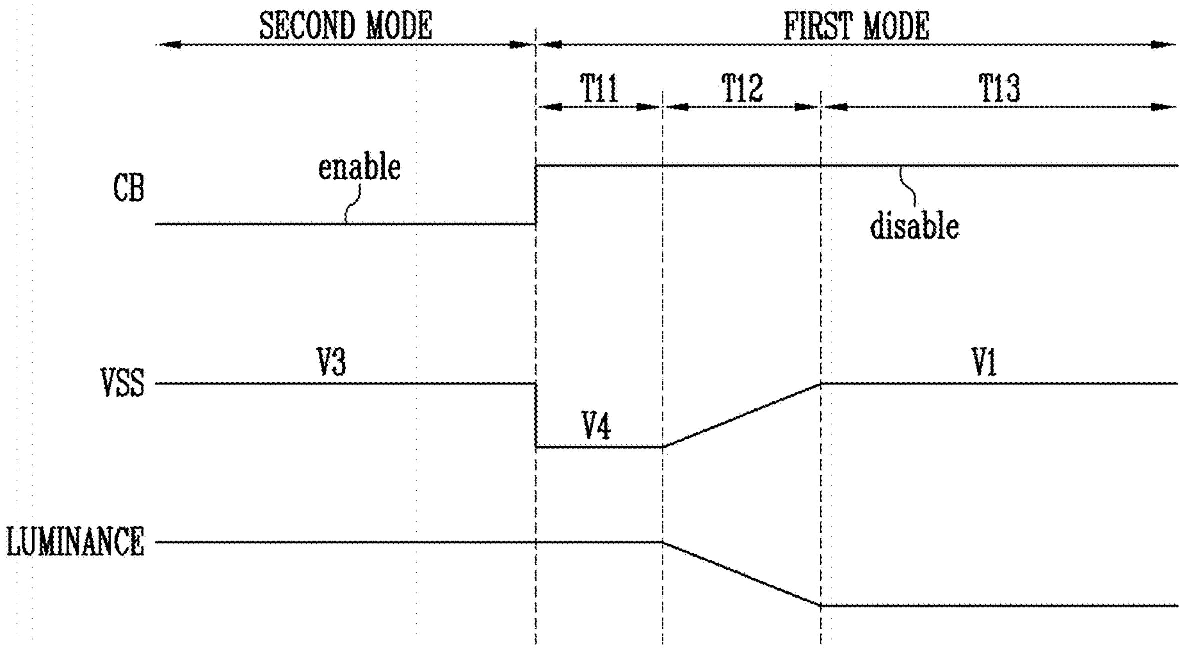
FIG. 10 is a diagram illustrating a mode change process in accordance with an embodiment of the present disclosure.

FIG. 10 is a diagram illustrating a mode change process in accordance with an embodiment of the present disclosure.

Referring to FIGS. 1 and 10, when the driving mode of the display device 100 changes from the second mode to the first mode, the timing controller 120 supplies a luminance control signal CB having a disabled state to the control line CL. The power supply 160 may decrease the voltage of the second driving power VSS when the driving mode of the display device 100 changes from the second mode to the first mode.

The power supply 160 may decrease the voltage of the second driving power VSS from the third voltage V3 to a fourth voltage V4 when the driving mode of the display device 100 changes from the second mode to the first mode. For example, the power supply 160 may decrease the voltage of the second driving power VSS at a third inclination. The third inclination may be set to an inclination substantially similar or identical to the right angle.

In the case where the voltage of the second driving power VSS decreases from the third voltage V3 to the fourth voltage V4, the luminance of the pixels PX may increase. The increment in luminance of the pixels PX corresponding to the decrease in the second driving power VSS may be similar or identical to the increment in luminance corresponding to a change in channel length of the first transistor M1 included in each of the pixels PX.

Therefore, in the case where the second driving power VSS decreases to the fourth voltage V4 when the luminance control signal CB of the disabled state is supplied, the luminance of the pixel component 110 may be maintained substantially at the same (or similar) luminance regardless of mode changes. For example, the value of the fourth voltage V4 may be experimentally determined to allow the pixel component 110 (or the pixels) to maintain a constant luminance when changing from the second mode to the first mode.

After the voltage of the second driving power VSS has decreased to the fourth voltage V4, the power supply 160 may maintain the fourth voltage V4 during an 11-th period T11 (or a certain period of time). For example, the 11-th period T11 may be set to a time of one frame or more. For example, the 11-th period T11 may be set to a time of ten seconds or less. For example, the 11-th period T11 may be experimentally determined in response to the type (e.g., resolution, size, or the like) of the display device 100.

The power supply 160 may increase the voltage of the second driving power VSS from the fourth voltage V4 to the first voltage V1 with a fourth inclination during a 12-th period T12 after the 11-th period T11. The fourth inclination may be set to a gentler inclination compared to the third inclination. In other words, the power supply 160 may gradually increase the voltage of the second driving power VSS from the fourth voltage V4 to the first voltage V1 during the 12-th period T12.

In the case where the voltage of the second driving power VSS gradually increases, the luminance of the pixel component 110 (or the pixels) may gradually decrease. In other words, in an embodiment of the present disclosure, the luminance of the pixel component 110 may gradually decrease when changing from the second mode to the first mode, thus preventing flickering or the like from being perceived by the viewer.

The power supply 160 may maintain the second driving power VSS at the first voltage V1 during a 13-th period T13 after the 12-th period T12. In the case where the second driving power VSS is maintained at the first voltage V1, the maximum luminance of the display device 100 may be set to the first luminance in response to the first mode.

Figure 11:
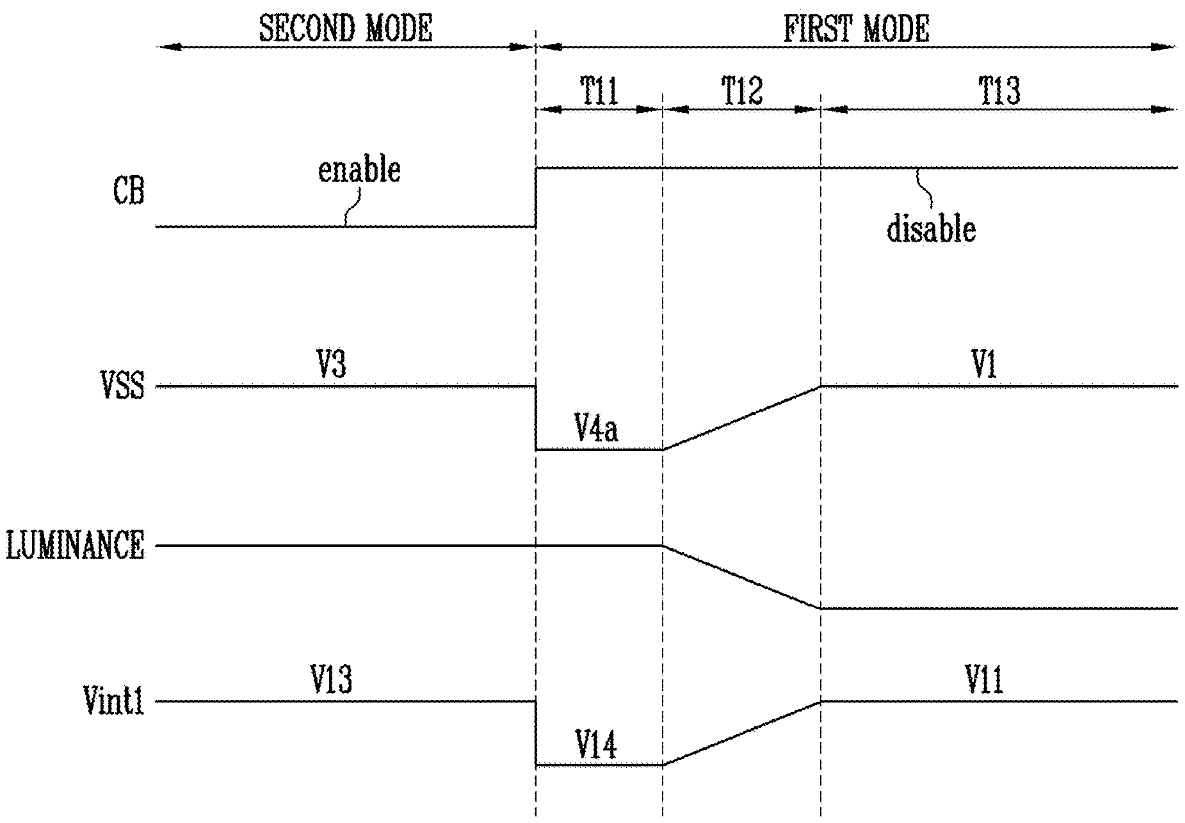
FIG. 11 is a diagram illustrating a mode change process in accordance with an embodiment of the present disclosure.

FIG. 11 is a diagram illustrating a mode change process in accordance with an embodiment of the present disclosure. In the following description of FIG. 11, explanations that overlap the description of FIG. 10 will be omitted.

Referring to FIG. 11, the power supply 160 may decrease the voltage of the second driving power VSS from the third voltage V3 to a fourth voltage V4*a* when the driving mode of the display device 100 changes from the second mode to the first mode. Furthermore, the power supply 160 may decrease the voltage of the first initialization power Vint1 from the 13-th voltage V13 to a 14-th voltage V14 when the driving mode of the display device 100 changes from the second mode to the first mode.

In the case where the voltage of the first initialization voltage Vint1 decreases, the gate electrode of the first transistor M1 included in each of the pixels PX may be initialized to a low voltage (i.e., the 14-th voltage V14), whereby the luminance of the pixels PX may increase. In the case where the voltage of the first initialization power Vint1 decreases when the display device 100 changes from the second mode to the first mode, the fourth voltage V4*a* may be set to a voltage higher than the fourth voltage V4 shown in FIG. 10 (in other words, a voltage fluctuation range of the second driving power VSS may be reduced).

The increment in luminance of the pixels PX corresponding to the decrease in the second driving power VSS and the decrease in the first initialization power Vint1 may be similar or identical to the decrement in luminance corresponding to a change in channel length of the first transistor M1 included in each of the pixels PX. In this case, it is possible to prevent a rapid decrease in the luminance of the pixel component 110 when the driving mode of the display device 100 changes from the second mode to the first mode.

For example, in the case where the second driving power VSS decreases to the fourth voltage V4*a* and the first initialization power Vint1 decreases to the 14-th voltage V14 when the luminance control signal CB having the disabled state is supplied, the luminance of the pixel component 110 may be maintained substantially at the same (or similar) luminance regardless of mode changes. For example, the value of the fourth voltage V4*a* and the value of the 14-th voltage V14 may be experimentally determined to allow the pixel component 110 (or the pixels) to maintain a constant luminance when changing from the second mode to the first mode.

The power supply 160 may maintain the fourth voltage V4*a* and the 14-th voltage V14 during the 11-th period T11 (or a certain period of time) after the voltage of the second driving power VSS has decreased to the fourth voltage V4*a* and the voltage of the first initialization power Vint1 has decreased to the 14-th voltage V14.

The power supply 160 may gradually increase the voltage of the second driving power VSS from the fourth voltage V4*a* to the first voltage V1 during a 12-th period T12 after the 11-th period T11. Further, the power supply 160 may gradually increase the voltage of the first initialization power Vint1 from the 14-th voltage V14 to the 11-th voltage V11 during the 12-th period T12.

In the case where the voltages of the second driving power VSS and the first initialization power Vint1 gradually increase, the luminance of the pixel component 110 (or the pixels) may gradually decrease. In other words, in an embodiment of the present disclosure, the luminance of the pixel component 110 may gradually decrease when changing from the second mode to the first mode, thus preventing flickering or the like from being perceived by the viewer.

The power supply 160 may maintain the second driving power VSS at the first voltage V1 during a 13-th period T13 after the 12-th period T12. The power supply 160 may maintain the first initialization power Vint1 at the 11-th voltage V11 during the 13-th period T13 after the second period T2.

Figure 12A:
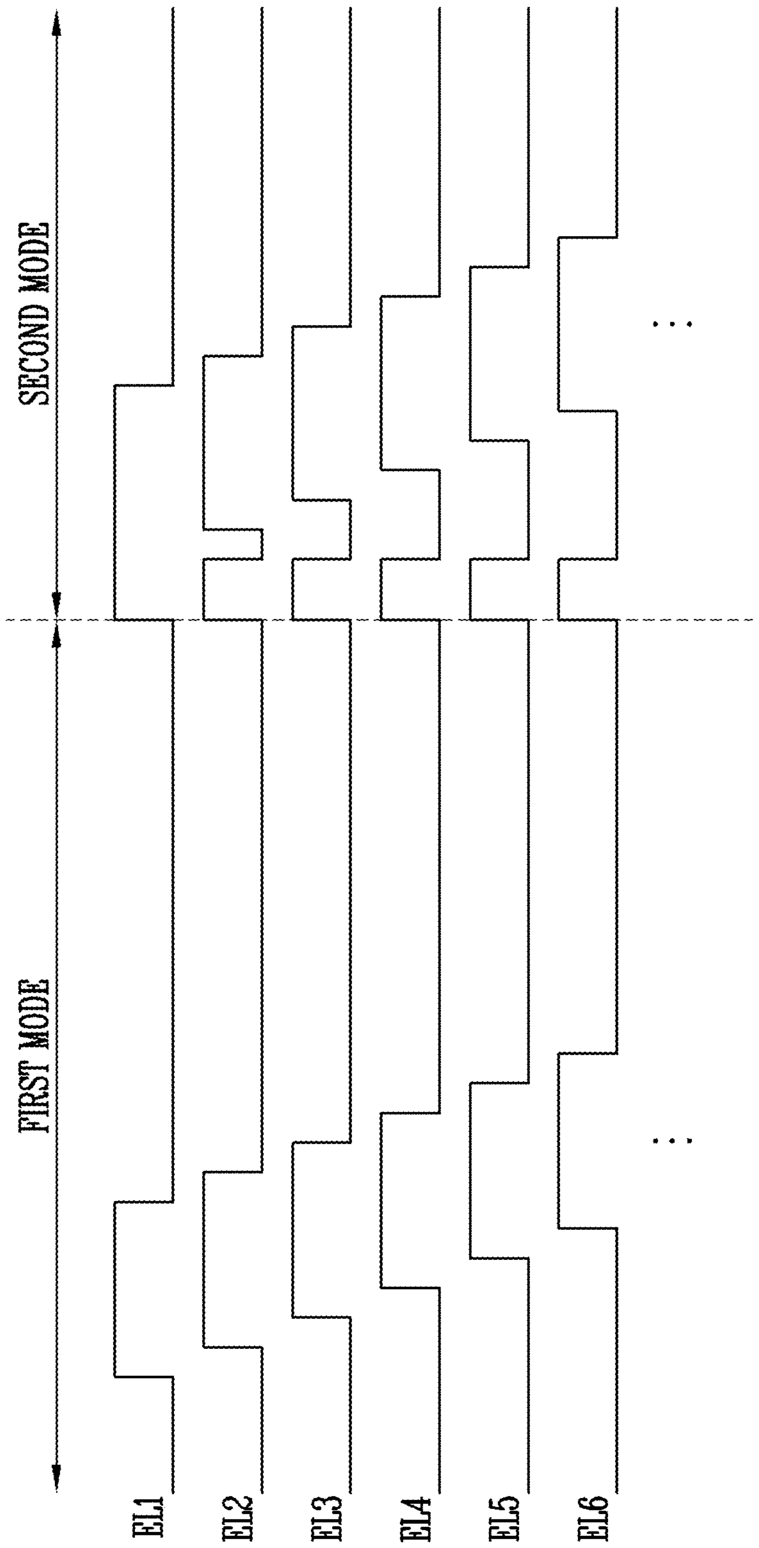
FIGS. 12A and 12B are waveform diagrams illustrating emission control signals in response to a mode change.
Figure 12B:
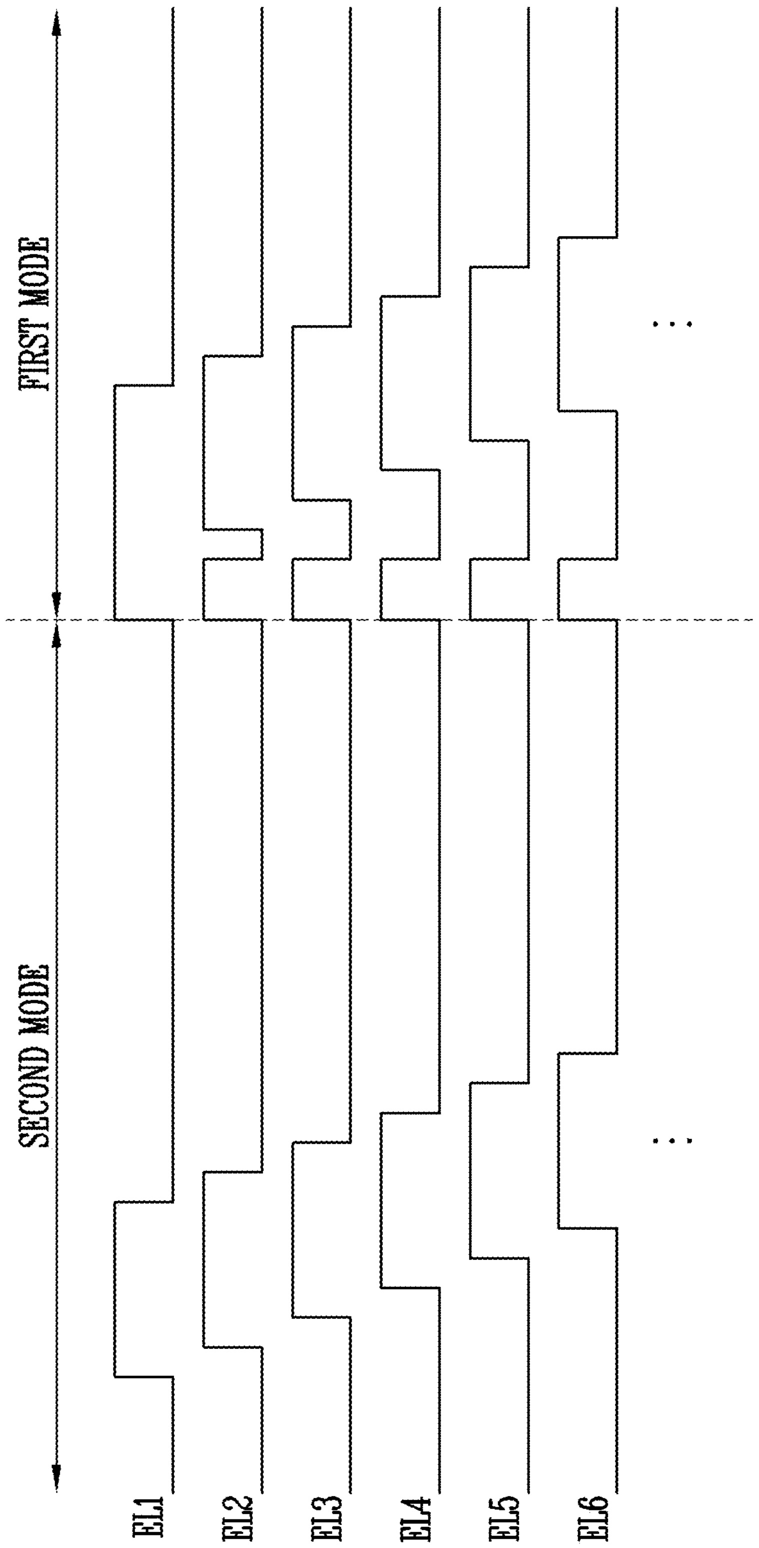

FIGS. 12A and 12B are waveform diagrams illustrating emission control signals in response to a mode change. In FIGS. 12A and 12B, for the convenience of explanation, there are illustrated six emission control lines EL1, EL2, EL3, EL4, EL5, and EL6.

Referring to FIG. 12A, when the driving mode of the display device 100 changes from the first mode to the second mode, an emission control signal may be simultaneously supplied to the emission control lines EL1 to EL6 (i.e., a gate-off voltage may be simultaneously supplied to the emission control lines EL1 to EL6). If the emission control signal is simultaneously supplied to the emission control lines EL1 to EL6, the pixels PX are set to a non-emission state.

As described with reference to FIG. 7, in an embodiment of the present disclosure, when the driving mode of the display device 100 changes from the first mode to the second mode, the voltage of the second driving power VSS may be increased from the first voltage V1 to the second voltage V2, thus preventing changes in luminance of the pixel component 110 from being perceived by the user.

However, due to a delay in the second power line PL2, the second voltage V2 of the second driving power VSS may not be supplied simultaneously to all of the pixels PX, thus resulting in a luminance difference between the upper and lower sides of the pixel component 110. Accordingly, in an embodiment of the present disclosure, when the driving mode of the display device 100 changes from the first mode to the second mode, the pixels PX may be set to the non-emission state. Thereby, the luminance difference in the pixel component 110 corresponding to the change in the second driving power VSS may be prevented from being perceived by the user.

Referring to FIG. 12B, when the driving mode of the display device 100 changes from the second mode to the first mode, an emission control signal may be simultaneously supplied to the emission control lines EL1 to EL6 (i.e., a gate-off voltage may be supplied to the emission control lines EL1 to EL6). If the emission control signal is simultaneously supplied to the emission control lines EL1 to EL6, the pixels PX are set to the non-emission state.

In the case where the pixels PX are set to the non-emission state when the driving mode of the display device 100 changes from the second mode to the first mode, the luminance difference in the pixel component 110 corresponding to the change in the second driving power VSS may be prevented from being perceived by the user.

FIG. 13 is a diagram illustrating a driving mode of the display device. In the description of FIG. 13, the process of changing the driving mode from the first mode to the second mode will be omitted.

Referring to FIG. 13, the driving mode of the display device 100 may further include a normal mode in addition to the first mode and the second mode.

In the normal mode, the maximum luminance may be set to a normal luminance. In the first mode, the maximum luminance may be set to the first luminance. In the second mode, the maximum luminance may be set to the second luminance. The first luminance may be set to a luminance higher than the normal luminance. The second luminance may be set to a luminance higher than the first luminance. For example, the normal luminance may be set to approximately 420 nit. The first luminance may be set to approximately 800 nit. The second luminance may be set to 1200 nit or more, e.g., 2000 nit.

When the driving mode changes from the normal mode to the first mode, the voltage of the second driving power VSS may gradually decrease from a fifth voltage V5 to a first voltage V1. In the case where the voltage of the second driving power VSS gradually decreases, the luminance of the pixel component 110 may gradually increase. If the voltage of the second driving power VSS decreases to the first voltage V1, the maximum luminance of the pixel component 110 may be set to the first luminance. Furthermore, if the voltage of the second driving power VSS gradually decreases when the driving mode changes from the normal mode to the first mode, changes in luminance of the pixel component 110 may be prevented from being perceived by the user.

In addition, the fifth voltage V5 may the same voltage as the second voltage V2, but the present disclosure is not limited thereto. For example, the fifth voltage V5 may be set to a voltage different from the second voltage V2. In an embodiment, the fifth voltage V5 may be experimentally determined such that the normal luminance that is the maximum luminance in the normal mode can be implemented.

Figure 14:
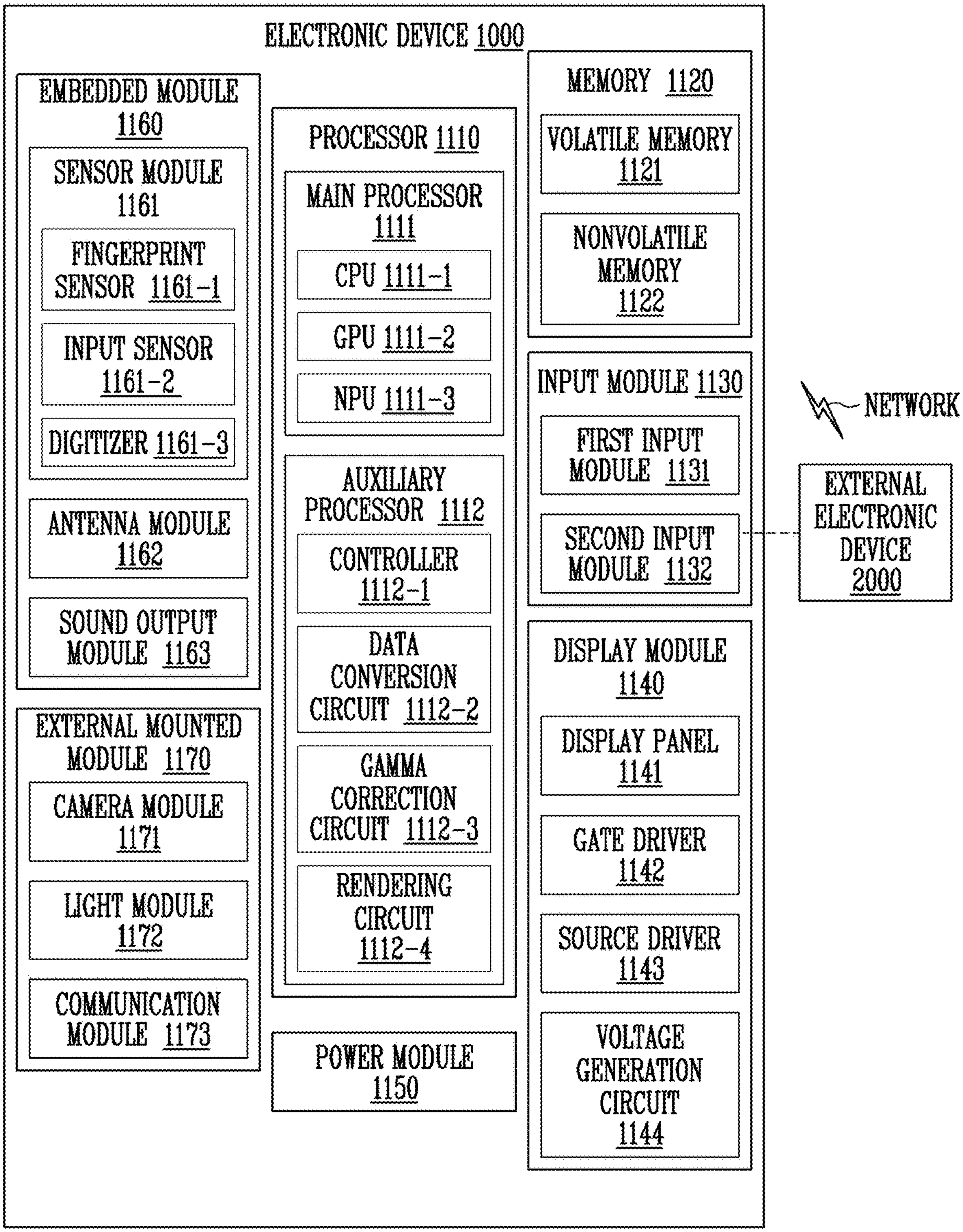
FIG. 14 is a diagram illustrating an electronic device in accordance with an embodiment of the present disclosure.

FIG. 14 is a diagram illustrating an electronic device in accordance with an embodiment of the present disclosure.

Referring to FIG. 14, the electronic device 1000 in accordance with an embodiment of the present disclosure may output a variety of information through a display module 1140. If a processor 1110 executes an application stored in a memory 1120, the display module 1140 may provide application information to the user through a display panel 1141. For example, the display panel 1141 may be the pixel component 110.

The processor 1110 may acquire an external input through an input module 1130 or a sensor module 1161, and execute an application corresponding to the external input. For example, in the case where the user selects a camera icon (or a camera application icon) displayed on the display panel 1141, the processor 1110 may acquire a user input through an input sensor 1161-2, and activate a camera module 1171. The processor 1110 may transmit image data corresponding to an image captured by the camera module 1171 to the display module 1140. The display module 1140 may display, on the display panel 1141, an image corresponding to the captured image.

As another example, in the case where personal information authentication is executed through the display module 1140, a fingerprint sensor 1161-1 may acquire inputted fingerprint information as input data. The processor 1110 may compare input data acquired through the fingerprint sensor 1161-1 with authentication data stored in the memory 1120, and may execute an application depending on a result of the comparison. The display module 1140 may display, on the display panel 1141, information executed according to the logic of the application. The fingerprint sensor 1161-1 may be disposed to make it possible to acquire fingerprint information in the overall area of the display module 1140 (or the display panel 1141).

As a further example, in the case where a music streaming icon displayed on the display module 1140 is selected, the processor 1110 may acquire a user input through the input sensor 1161-2, and activate a music streaming application stored in the memory 1120. If a music playing command is inputted in the music streaming application, the processor 1110 may activate a sound output module 1163 and provide sound information corresponding to the music playing command to the user.

Hitherto, a brief description of the operation of the electronic device 1000 has been provided. Hereinafter, the configuration of the electronic device 1000 will be described in detail. Some of the components of the electronic device 1000 to be described below may be integrated into a single component, or one component may be separated into two or more components.

The electronic device 1000 may communicate with an external electronic device 2000 through a network (e.g., a short-range wireless communication network or a long-range wireless communication network). In an embodiment, the electronic device 1000 may include a processor 1110, a memory 1120, an input module 1130, a display module 1140, a power module 1150, an embedded module 1160, and an external mounted module 1170. In an embodiment, in the electronic device 1000, at least one of the foregoing components may be omitted, or one or more other components may be added. In an embodiment, some components (e.g., the sensor module 1161, an antenna module 1162, or the sound output module 1163) among the foregoing components may be integrated into another component (e.g., the display module 1140).

The processor 1110 may execute software to control at least one other component (e.g., a hardware or software component) of the electronic device 1000 connected to the processor 1110 and perform various data processing or computing operations. In an embodiment, as at least a portion of a data processing or computing operation, the processor 1110 may store a command or data received from another component (e.g., the input module 1130, the sensor module 1161, or a communication module 1173) in a volatile memory 1121, process the command or data stored in the volatile memory 1121, and store result data in a nonvolatile memory 1122.

The processor 1110 may include a main processor 1111 and an auxiliary processor 1112. The main processor 1111 may include one or more of a central processing unit (CPU) 1111-1 and an application processor (AP). The main processor 1111 may further include any one or more of a graphic processing unit (GPU) 1111-2, a communication processor (CP), and an image signal processor (ISP). The main processor 1111 may further include a neural processing unit (NPU) 1111-3. The NPU 1111-3 may be a processor specialized to process an artificial intelligence model. The artificial intelligence model may be generated by machine learning. The artificial intelligence model may include a plurality of artificial neural network layers. An artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-networks, or a combination of two or more among the foregoing networks, but is not limited thereto. The artificial intelligence model may not only include a hardware structure but may also include an additional or substitutive software structure. At least two of the foregoing processing units and the processors may be implemented as a single integrated component (e.g., a single chip). Alternatively, the processing units and the processors may be implemented as respective independent components (e.g., a plurality of chips).

The auxiliary processor 1112 may include a controller 1112-1. The controller 1112-1 may include an interface conversion circuit and a timing control circuit. For example, the controller 1112-1 may include the timing controller 120 shown in FIG. 1. The controller 1112-1 may receive an image signal from the main processor 1111, and may convert a data format of the image signal to a format corresponding to specifications of an interface with the display module 1140 and output image data. The controller 1112-1 may output various control signals needed to drive the display module 1140.

The main processor 1111 may acquire mode information of the display module 1140 from the input module 1130 or the sensor module 1161, corresponding to the settings of the user, and generate a driving mode signal corresponding to the mode information. The driving mode signal generated from the main processor 1111 may be supplied to the auxiliary processor 1112 (or the controller 1112-1). Furthermore, the main processor 1111 may acquire mode information of the display module 1140 in response to an external light intensity measured by the internal module 1160, and may supply the driving mode signal corresponding to the mode information to the auxiliary processor 1112 (or the controller 1112-1). The driving mode signal may correspond to the normal mode, the first mode, or the second mode.

The auxiliary processor 1112 (or the controller 1112-1) supplied with the driving mode signal may generate an enable luminance control signal CB or a disable luminance control signal CB corresponding to the driving mode, and supply the generated luminance control signal CB to the control line CL.

The auxiliary processor 1112 may further include a data conversion circuit 1112-2, a gamma correction circuit 1112-3, a rendering circuit 1112-4, a touch control circuit 1112-5, which is not shown, and the like. The data conversion circuit 1112-2 may receive image data from the controller 1112-1, compensate for the image data to allow an image to be displayed at a desired luminance according to characteristics of the electronic device 1000 or settings of the user, or may convert the image data to reduce power consumption or compensate for afterimages.

The gamma correction circuit 1112-3 may convert image data, a gamma reference voltage, or the like so that an image to be displayed on the electronic device 1000 can have desired gamma characteristics. The rendering circuit 1112-4 may receive image data from the controller 1112-1, and render the image data taking into account pixel arrangement or the like on the display panel 1141 applied to the electronic device 1000.

The touch control circuit may supply a touch signal to the input sensor 1161-2, and receive a sensing signal from the input sensor 1161-2 in response to the touch signal.

At least one among the data conversion circuit 1112-2, the gamma correction circuit 1112-3, the rendering circuit 1112-4, and the touch control circuit may be integrated into another component (e.g., the main processor 1111 or the controller 1112-1). At least one among the data conversion circuit 1112-2, the gamma correction circuit 1112-3, and the rendering circuit 1112-4 may be integrated into a source driver 1143 to be described below.

The memory 1120 may store a variety of data to be used in at least one component (e.g., the processor 1110 or the sensor module 1161) of the electronic device 1000, and input data or output data for a command pertaining to the data. Furthermore, the memory 1120 may store a variety of setting data corresponding to settings of the user. The memory 1120 may include at least one or more of the volatile memory 1121 and the nonvolatile memory 1122.

The input module 1130 may receive a command or data to be used in a component (e.g., the processor 1110, the sensor module 1161, or the sound output module 1163) of the electronic device 1000 from an external device (e.g., the user or an external electronic device 2000) provided outside the electronic device 1000.

The input module 1130 may include a first input module 1131 configured to receive a command or data inputted from the user, and a second input module 1132 configured to receive a command or data inputted from the external electronic device 2000. The first input module 1131 may include a microphone, a mouse, a keyboard, a key (e.g., a button), or a pen (e.g., a passive pen or an active pen). The second input module 1132 may support a designated protocol, which can be connected to the external electronic device 2000 in a wired or wireless manner. In an embodiment, the second input module 1132 may include a high definition multimedia interface (HDMI), a universal serial bus (USB) interface, an SD card interface, or an audio interface. The second input module 1132 may include a connector, e.g., an HDMI connector, a USB connector, an SD card connector, or an audio connector (e.g., a headphone connector), for physical connection with the external electronic device 2000.

The display module 1140 may provide visual information to the user. The display module 1140 may include a display panel 1141, a gate driver 1142, and a source driver 1143. The display module 1140 may further include a window, a chassis, and a bracket to protect the display panel 1141. The display module 1140 may include the display device 100 illustrated in FIG. 1. The gate driver 1142 may corresponds to the scan driver 130. The source driver 1143 may corresponds to the data driver 140. The display module 1140 may additionally include the timing controller 120 and the emission driver 150.

The display panel 1141 (or a display) may include a liquid crystal display panel, an organic light emitting display panel, or an inorganic light emitting display panel. The type of display panel 1141 is not limited to a particular type. The display panel 1141 is a rigid type panel, or a flexible type panel, which is rollable or foldable. The display module 1140 may further include a support, a bracket, or a heat dissipater, which may support the display panel 1141.

The display panel 1141 may receive image data from the auxiliary processor 1112, and display images while controlling the amount of current flowing from the first driving power VDD to the second driving power VSS via the pixels PX in correspondence with the image data. The gate driver 1142 may be mounted on the display panel 1141 as a driving chip.

The gate driver 1142 may be integrated on the display panel 1141. For example, the gate driver 1142 may include an amorphous silicon TFT gate (ASG) driver circuit, a low temperature polycrystalline silicon (LTPS) TFT gate driver circuit, or an oxide semiconductor TFT gate (OSG) driver circuit, which is internalized in the display panel 1141. The gate driver 1142 may receive a control signal from the controller 1112-1, and output scan signals to the display panel 1141 in response to the control signal. The gate driver 1142 may include the scan driver 130 illustrated in FIG. 1.

The display module 1140 may further include an emission driver. The emission driver may output an emission control signal to the display panel 1141 in response to a control signal received from the controller 1112-1. The emission driver may be formed separately from the gate driver 1142, or may be integrated into the gate driver 1142. The emission driver may include the emission driver 150 illustrated in FIG. 1.

The source driver 1143 may receive a control signal from the controller 1112-1, convert image data to an analog voltage (e.g., a data signal) in response to the control signal, and output data signals to the display panel 1141. The source driver 1143 may include the data driver 140 illustrated in FIG. 1.

The source driver 1143 may be integrated into another component (e.g., the controller 1112-1). The functions of the interface conversion circuit and the timing control circuit of the controller 1112-1 may be integrated into the source driver 1143.

The display module 1140 may further include a voltage generation circuit 1144. The voltage generation circuit 1144 may output various voltages needed to drive the display panel 1141. For example, the voltage generation circuit 1144 may include the power supply 160 shown in FIG. 1. In other words, the power generation circuit 1144 may control the voltage of the second driving power VSS and/or the first initialization power Vint1 in correspondence with the driving mode of the display module 1140. The detailed explanations pertaining thereto have been made with reference to FIGS. 1 to 13; therefore, redundant explanations will be omitted.

In an embodiment, the display panel 1141 may include a plurality of pixel columns each including a plurality of pixels.

In an embodiment, the source driver 1143 may convert data that is included in image data received from the processor 1110 and corresponds to red (R), green (G), and blue (B) to a red data signal (or a data voltage), a green data signal, and a blue data signal, and provide the data signals to a plurality of pixel columns included in the display panel 1141 during a single horizontal period.

The power module 1150 may supply power to the components of the electronic device 1000. The power module 1150 may include a battery to store a power voltage. The battery may include a primary cell, which cannot be recharged, and a secondary cell or a fuel cell, which are rechargeable. The power module 1150 may include a power management integrated circuit (PMIC). The PMIC may supply optimized power to each of the foregoing modules and modules to be described below. The power module 1150 may include a wireless power transceiver that is electrically connected with the battery. The wireless power transceiver may include a plurality of coiled antenna radiators.

The electronic device 1000 may further include an embedded module 1160 and an external mounted module 1170. The embedded module 1160 may include a sensor module 1161, an antenna module 1162, and a sound output module 1163. The external mounted module 1170 may include a camera module 1171, a light module 1172, and a communication module 1173.

The sensor module 1161 may sense an input from the body of the user or an input from a pen of the first input module 1131, and generate an electric signal or a data value corresponding to the input. The sensor module 1161 may include at least one or more among a fingerprint sensor 1161-1, an input sensor 1161-2, and a digitizer 1161-3.

The fingerprint sensor 1161-1 may generate a data value corresponding to the fingerprint of the user. The fingerprint sensor 1161-1 may include any one of an optical fingerprint sensor and a capacitive fingerprint sensor.

The input sensor 1161-2 may generate a data value corresponding to coordinate information of an input from the body of the user or an input from the pen. The input sensor 1161-2 may generate a data value corresponding to the amount of change in capacitance by the input. The input sensor 1161-2 may sense an input from a passive pen, or transmit or receive data to or from an active pen.

The input sensor 1161-2 may measure a biometric signal pertaining to biometric information such as a blood pressure, body fluid, or body fat. For example, in the case where the user brings a part of his/her body into contact with the sensor layer or the sensing panel and remains stationary for a certain time, the input sensor 1161-2 may sense a biometric signal, based on a change in electric field by the part of his/her body, and output information desired by the user to the display module 1140.

The digitizer 1161-3 may generate a data value corresponding to coordinate information of an input from a pen. The digitizer 1161-3 may generate data values corresponding to electromagnetic variations caused by the input. The digitizer 1161-3 may sense an input from a passive pen, or transmit or receive data to or from an active pen.

At least one of the fingerprint sensor 1161-1, the input sensor 1161-2, and the digitizer 1161-3 may be implemented as a sensor layer formed on the display panel 1141 through a successive process. At least one among the fingerprint sensor 1161-1, the input sensor 1161-2, and the digitizer 1161-3 may be disposed over the display panel 1141. Any one among the fingerprint sensor 1161-1, the input sensor 1161-2, and the digitizer 1161-3, for example, the digitizer 1161-3, may be disposed under the display panel 1141.

At least two or more among the fingerprint sensor 1161-1, the input sensor 1161-2, and the digitizer 1161-3 may be formed to be integrated into a single sensing panel through the same process. In the case where at least two or more among the fingerprint sensor 161-1, the input sensor 161-2, and the digitizer 161-3 are integrated into a single sensing panel, the sensing panel may be disposed between the display panel 1141 and a window disposed over the display panel 1141. In an embodiment, the sensing panel may be disposed on the window, and the position of the sensing panel is not particularly limited.

At least one of the fingerprint sensor 1161-1, the input sensor 1161-2, and the digitizer 1161-3 may be embedded in the display panel 1141. In other words, during a process of forming components (e.g., a light emitting element, a transistor, and the like) included in the display panel 1141, at least one among the fingerprint sensor 1161-1, the input sensor 1161-2, and the digitizer 1161-3 may be formed simultaneously with the components.

In addition, the sensor module 1161 may generate an electrical signal or data value corresponding to internal conditions or external conditions of the electronic device 1000. The sensor module 1161 may further include, for example, a gesture sensor, a gyroscope sensor, an atmospheric sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The antenna module 1162 may include one or more antennas to transmit or receive a signal or power to or from an external device. In an embodiment, the communication module 1173 may transmit a signal to an external electronic device or receive a signal from the external electronic device through an antenna suitable for a communication scheme. An antenna pattern of the antenna module 1162 may be integrated to a component of the display module 1140 (e.g., the display panel 1141 of the display module 1140) or the input sensor 1161-2.

The sound output module 1163 may be a device for outputting a sound signal to a device provided outside the electronic device 1000, and, for example, may include a speaker, which is used for typical purposes such as reproducing multimedia or record data, and a receiver, which is used only for phone reception. In an embodiment, the receiver may be integrally or separately formed with a speaker. A sound output pattern of the sound output module 1163 may be integrated into the display module 1140.

The camera module 1171 may capture a static image or a video. In an embodiment, the camera module 1171 may include one or more lenses, an image sensor, or an image signal processor. The camera module 1171 may further include an infrared camera capable of sensing the presence of the user, the position of the user, a line of sight of the user, etc.

The light module 1172 may provide light. The light module 1172 may include a light emitting diode or a xenon lamp. The light module 1172 may be operated interlocking with the camera module 1171 or operated independently therefrom.

The communication module 1173 may form a wire or wireless communication channel between the electronic device 1000 and the external electronic device 2000, and support execution of communication through the formed communication channel. The communication module 1173 may include either or both a wireless communication module such as a cellular communication module, a short-range wireless communication module, or a global navigation satellite system (GNSS) communication module, and a wire communication module such as a local area network (LAN) communication module, or a power line communication module. The communication module 1173 may communicate with the external electronic device 2000 through a short-range communication network such as Bluetooth, WiFi Direct or infrared data association (IrDA), or a long-range communication network such as a cellular network, an internet, or a computer network (e.g., LAN or WAN). The various types of communication modules 1173 described above may be implemented as a single chip or may be implemented as respective separate chips.

The input module 1130, the sensor module 1161, the camera module 1171, and the like, interacting with the processor 1110, may be used to control the operation of the display module 1140

The processor 1110 may output a command or data to the display module 1140, the sound output module 1163, the camera module 1171, or the light module 1172, based on input data received from the input module 1130. For example, the processor 1110 may generate image data in response to input data applied through a mouse, an active pen, or the like and output the image data to the display module 1140, or may generate command data in response to input data and output the command data to the camera module 1171 or the light module 1172. In the case where input data is not received from the input module 1130, the processor 1110 may convert the operation mode of the electronic device 1000 to a low-power mode or a sleep mode, thus reducing the power consumption of the electronic device 1000.

The processor 1110 may output a command or data to the display module 1140, the sound output module 1163, the camera module 1171, or the light module 1172, based on sensing data received from the sensor module 1161. For example, the processor 1110 may compare authentication data applied from the fingerprint sensor 1161-1 with the authentication data stored in the memory 1120, and may execute an application depending on a result of the comparison. The processor 1110 may execute a command based on sensing data sensed by the input sensor 1161-2 or the digitizer 1161-3, or output corresponding image data to the display module 1140. In the case where the sensor module 1161 includes a temperature sensor, the processor 1110 may receive temperature data for a measured temperature from the sensor module 1161, and further execute a luminance correction operation for the image data based on the temperature data.

The processor 1110 may receive measurement data for the presence of the user, the position of the user, a line of sight of the user, or the like from the camera module 1171. The processor 1110 may further execute a luminance correction operation for the image data based on the measurement data. For example, the processor 1110 that has determined whether the user is present through an input from the camera module 1171 may output, to the display module 1140, image data the luminance of which is corrected by the data conversion circuit 1112-2 or the gamma correction circuit 1112-3.

Some components among the foregoing components may be connected to each other by a communication scheme, e.g., a bus, general purpose input/output (GPIO), a serial peripheral interface (SPI), a mobile industry processor interface (MIPI), or a ultra path interconnect (UPI) link, which can be used between peripheral devices, and may thus exchange a signal (e.g., a command or data) therebetween. The processor 1110 may communicate with the display module 1140 through a predefined interface. For example, any one of the foregoing communication schemes may be used, and the interface is not limited to the foregoing communication schemes.

In a display device, a method of driving the display device, and an electronic device including the display device in accordance with embodiments of the present disclosure, voltage of second driving power VSS and/or first initialization power Vint1 may change when the maximum luminance of the display device changes, thus preventing a flickering phenomenon from occurring.

In the display device, the method of driving the display device, and the electronic device including the display device in accordance with embodiments of the present disclosure, the pixels may be set to a non-emission state when the maximum luminance of the display device changes, whereby changes in luminance can be prevented from being perceived by a user.

However, effects of the present disclosure are not limited to the above-described effects, and various modifications are possible without departing from the spirit and scope of the present disclosure.

While embodiments of the present disclosure have been described above, those skilled in the art will appreciate that various modifications, additions and substitutions are possible, without departing from the scope and spirit of the present disclosure claimed in the appended claims.

What is claimed is:

1. A display device, comprising:

a power supply configured to supply a voltage of first driving power to a first power line, and supply a voltage of second driving power to a second power line;

a display panel comprising pixels connected to scan lines and data lines, and each of the pixels including a first transistor configured to control an amount of current supplied from the first power line to the second power line via a light emitting element; and a timing controller configured to supply a luminance control signal to the pixels, wherein each of the pixels further comprises:

a control transistor connected in parallel to some sub-transistors of the corresponding first transistor, and configured to be turned on in response to receipt of the luminance control signal having an enabled state, wherein the power supply changes the voltage of the second driving power when the luminance control signal having the enabled state is supplied to the pixels.

2. The display device according to claim 1, wherein the power supply increases the second driving power from a first voltage to a second voltage higher than the first voltage when the luminance control signal changes from a disabled state to the enabled state.

3. The display device according to claim 2, wherein the power supply maintains the second driving power at the second voltage for a period of time and then gradually decreases the second driving power to a third voltage lower than the second voltage.

4. The display device according to claim 3, wherein the third voltage is identical to the first voltage.

5. The display device according to claim 3, wherein the third voltage is different from the first voltage.

6. The display device according to claim 3, wherein the power supply further supplies first initialization power for initializing a gate electrode of the first transistor to the pixels.

7. The display device according to claim 6, wherein the power supply increases the first initialization power from a first initialization voltage to a second initialization voltage higher than the first initialization voltage when the luminance control signal changes from the disabled state to the enabled state.

8. The display device according to claim 7, wherein the power supply maintains the first initialization power at the second initialization voltage for the period of time and then gradually decreases the first initialization power to a third initialization voltage lower than the second initialization voltage.

9. The display device according to claim 1, wherein the power supply decreases the second driving power from a first voltage to a second voltage lower than the first voltage when the luminance control signal changes from the enabled state to a disabled state.

10. The display device according to claim 9, wherein the power supply maintains the second driving power at the second voltage for a period of time and then gradually increases the second driving power to a third voltage higher than the second voltage.

11. The display device according to claim 10, wherein the power supply further supplies first initialization power for initializing a gate electrode of the first transistor to the pixels.

12. The display device according to claim 11, wherein the power supply decreases the first initialization power from a first initialization voltage to a second initialization voltage lower than the first initialization voltage when the luminance control signal changes from the enabled state to the disabled state.

13. The display device according to claim 12, wherein the power supply maintains the first initialization power at the second initialization voltage for the period of time and then gradually increases the first initialization power to a third initialization voltage higher than the second initialization voltage.

14. The display device according to claim 1, further comprising a plurality of emission control lines connected to the pixels, wherein each of the pixels is controlled during an emission time by an emission control signal supplied to the corresponding emission control line connected thereto.

15. The display device according to claim 14, further comprising an emission driver configured to supply an emission control signal to the emission control lines, wherein the emission driver simultaneously supplies the emission control signal having a disabled state to the emission control lines to prevent the pixels from emitting light when the luminance control signal changes from a disabled state to the enabled state.

16. The display device according to claim 15, wherein the emission driver simultaneously supplies the emission control signal having the disabled state to the emission control lines when the luminance control signal changes from the enabled state to the disabled state.

17. The display device according to claim 1, wherein each of the pixels comprises:

the light emitting element including a second electrode electrically connected to the second power line;

the first transistor including the plurality of sub-transistors connected in series between a first node and a second node, the first node being electrically connected to the first power line during an emission period in which the light emitting element emits light, and the second node being electrically connected to a first electrode of the light emitting element during the emission period; and the control transistor connected a common node between the first node and the sub-transistors, with a gate electrode connected to a control line, and configured to be turned on when the luminance control signal having the enabled state is supplied to the control line, and turned off when the luminance control signal having a disabled state is supplied to the control line.

18. The display device according to claim 17, wherein each of the pixels comprises:

a second transistor connected between a data line and the first node, and including a gate electrode electrically connected to a first scan line;

a third transistor connected between the second node and a third node to which gate electrodes of the sub-transistors are connected, and including a gate electrode electrically connected to a second scan line;

a fourth transistor connected between the third node and a third power line configured to receive first initialization power, and including a gate electrode electrically connected to a third scan line;

a fifth transistor connected between the first power line and the first node, and including a gate electrode electrically connected to an emission control line;

a sixth transistor connected between the second node and the first electrode of the light emitting element, and including a gate electrode electrically connected to the emission control line; and a seventh transistor connected between the first electrode of the light emitting element and a fourth power line configured to receive second initialization power, and including a gate electrode electrically connected to a fourth scan line.

19. The display device according to claim 17, wherein the control line is connected in common to the control transistors included in the respective pixels.

20. The display device according to claim 17, including a first mode in which a maximum luminance of the display panel is set to a first luminance, and a second mode in which a maximum luminance of the display panel is set to a second luminance higher than the first luminance, wherein the timing controller supplies the luminance control signal having a disabled state when a driving mode is set to the first mode, and supplies the luminance control signal having the enabled state when the driving mode is set to the second mode.

21. The display device according to claim 20, further including a normal mode in which the maximum luminance of the display panel is set to a normal luminance lower than the first luminance, wherein the power supply gradually decreases the voltage of the second driving power when the driving mode changes from the normal mode to the first mode.

22. A display device, comprising:

a power supply configured to supply a voltage of first driving power to a first power line, and supply a voltage of second driving power to a second power line;

pixels each comprising: a plurality of sub-transistors configured to control an amount of current to be supplied from the first power line to the second power line via a light emitting element; and a control transistor connected to a common node between the first power line and the sub-transistors, and configured to be turned on in response to receipt of a luminance control signal having an enabled state, and turned off in response to receipt of the luminance control signal having a disabled state; and a timing controller configured to supply the luminance control signal to a control line connected in common to a gate electrode of the control transistor, wherein the power supply changes the voltage of the second driving power when the luminance control signal changes from the enabled state to the disabled state or changes from the disabled state to the enabled state.

23. The display device according to claim 22, wherein the power supply increases the voltage of the second driving power when the luminance control signal changes from the disabled state to the enabled state.

24. The display device according to claim 23, wherein the power supply gradually decreases the voltage of the second driving power after a period of time following the increase in the voltage of the second driving power.

25. The display device according to claim 22, wherein the power supply decreases the voltage of the second driving power when the luminance control signal changes from the enabled state to the disabled state.

26. The display device according to claim 25, wherein the power supply gradually increases the voltage of the second driving power after a period of time following the decrease in the voltage of the second driving power.

27. The display device according to claim 22, wherein the power supply further supplies first initialization power for initializing respective gate electrodes of the plurality of sub-transistors.

28. The display device according to claim 27, wherein the power supply increases a voltage of the first initialization power when the luminance control signal changes from the disabled state to the enabled state.

29. The display device according to claim 28, wherein the power supply gradually decreases the voltage of the first initialization power after a period of time following the increase in the voltage of the first initialization power.

30. The display device according to claim 27, wherein the power supply decreases the voltage of the first initialization power when the luminance control signal changes from the enabled state to the disabled state.

31. The display device according to claim 30, wherein the power supply gradually increases the voltage of the first initialization power after a period of time following the decrease in the voltage of the first initialization power.

32. The display device according to claim 22, further comprising a plurality of emission control lines connected to the pixels, wherein each of the pixels is set to a non-emission state when an emission control signal having a disabled state is supplied to an emission control line connected thereto.

33. The display device according to claim 32, further comprising an emission driver configured to supply the emission control signal to the emission control lines, wherein the emission driver simultaneously supplies the emission control signal of the disabled state to the emission control lines when the luminance control signal changes from the enabled state to the disabled state or changes from the disabled state to the enabled state.

34. A method of driving a display device comprising pixels each including a driving transistor configured to control an amount of current flowing from first driving power to second driving power via a light emitting element, the method comprising:

determining whether the display device is in a first mode or a second mode;

driving the pixels to have a maximum luminance set to a first luminance when it is determined that the display device is in the first mode;

driving the pixels to have the maximum luminance set to a second luminance higher than the first luminance when it is determined that the display device is in the second mode; and controlling a control transistor connected in parallel to some sub-transistors of the driving transistor when changing from the first mode to the second mode or changing from the second mode to the first mode, wherein a voltage of the second driving power changes when changing from the first mode to the second mode or changing from the second mode to the first mode.

35. The method according to claim 34, wherein the sub-transistors are connected in series, wherein when the pixels are driven in the first mode, current is supplied from all the sub-transistors to the light emitting element, and wherein when the pixels are driven in the second mode, current is supplied from some of the sub-transistors to the light emitting element.

36. The method according to claim 34, wherein when changing from the first mode to the second mode, the voltage of the second driving power increases at a first slope.

37. The method according to claim 36, wherein a voltage of the second driving power increases at the first slope, and after a period of time, the voltage of the second driving power decreases at a second slope gentler than the first slope.

38. The method according to claim 34, further comprising initializing a gate electrode of the driving transistor by a voltage of first initialization power, and increasing the voltage of the first initialization power when changing from the first mode to the second mode.

39. The method according to claim 34, wherein when changing from the second mode to the first mode, a voltage of the second driving power decreases at a first slope.

40. The method according to claim 39, wherein a voltage of the second driving power decreases at the first slope, and after a period of time, the voltage of the second driving power increases at a second slope gentler than the first slope.

41. The method according to claim 34, further comprising initializing a gate electrode of the driving transistor by a voltage of first initialization power, and decreasing the voltage of the first initialization power when changing from the second mode to the first mode.

42. The method according to claim 34, further comprising preventing the pixels from emitting light when changing from the first mode to the second mode or changing from the second mode to the first mode.

43. The method according to claim 34, further comprising a normal mode in which the maximum luminance is set to a normal luminance lower than the first luminance, wherein when changing from the normal mode to the first mode, the voltage of the second driving power decreases.

44. An electronic device comprising:

a main processor configured to generate a driving mode signal based on at least one of an external light intensity and settings of a user;

an auxiliary processor configured to supply a luminance control signal set to one of an enabled state or a disabled state in response to the driving mode signal;

a display panel configured to control an amount of current flowing from first driving power to second driving power via pixels in response to a data signal supplied from the auxiliary processor, and display an image; and a voltage generation circuit configured to supply the second driving power of a first voltage when the luminance control signal having the disabled state is supplied, and supply the second driving power of a second voltage that is higher than the first voltage when the luminance control signal having the enabled state is supplied, wherein the pixels supply a higher current when the luminance control signal having the enabled state is supplied in response to the data signal, compared to when the luminance control signal having the disabled state is supplied in response to the same data signal.

45. The electronic device according to claim 44, wherein a maximum luminance of the pixels changes in response to a mode of the driving mode signal.

46. The electronic device according to claim 44, wherein the voltage generation circuit gradually decreases the second driving power from the second voltage to a third voltage lower than the second voltage.

* * * * *